US010503381B2

(12) United States Patent
Schrock et al.

(10) Patent No.: US 10,503,381 B2
(45) Date of Patent: Dec. 10, 2019

(54) MULTI-SCREEN EMAIL CLIENT

(71) Applicant: Z124, George Town (KY)

(72) Inventors: Rodney W. Schrock, San Diego, CA (US); Paul E. Reeves, Oakville (CA); Sanjiv Sirpal, Oakville (CA); Alexander de Paz, Burlington (CA); Aaron VonderHaar, San Diego, CA (US); Martin Gimpl, Helsinki (FI); Salvador Soto, Toronto (CA); Stanley Kurdziel, San Diego, CA (US); Paul Webber, San Diego, CA (US)

(73) Assignee: Z124, George Town (KY)

( * ) Notice: Subject to any disclaimer, the term of this patent is extended or adjusted under 35 U.S.C. 154(b) by 263 days.

(21) Appl. No.: 15/075,644

(22) Filed: Mar. 21, 2016

(65) Prior Publication Data

US 2016/0274783 A1 Sep. 22, 2016

Related U.S. Application Data

(63) Continuation of application No. 13/299,203, filed on Nov. 17, 2011, now abandoned.
(Continued)

(51) Int. Cl.
*G06F 1/16* (2006.01)
*G06F 3/01* (2006.01)
(Continued)

(52) U.S. Cl.
CPC ........ *G06F 3/04847* (2013.01); *G06F 1/1647* (2013.01); *G06F 3/017* (2013.01);
(Continued)

(58) Field of Classification Search
CPC ....... G06F 3/04886; G06F 2203/04803; G06F 3/1423; G06F 3/04847; G06F 1/1647;
(Continued)

(56) References Cited

U.S. PATENT DOCUMENTS 5,659,694 A 8/1997 Bibayan
5,761,485 A 6/1998 Munyan
(Continued)

FOREIGN PATENT DOCUMENTS

CN 101518035 8/2009
JP 2003-140798 5/2003
(Continued)

OTHER PUBLICATIONS

Google images, accessed Apr. 18, 2011, 6 pages.
(Continued)

*Primary Examiner* — David S Posigian
(74) *Attorney, Agent, or Firm* — Sheridan Ross P.C.

(57) ABSTRACT

An email client having multiple screens that may be displayed in different corresponding ones of a plurality of different display portions of a handheld electronic device. The screens of the email client may be related by way of a dependency relationship and/or may provide for control between the various screens. In one embodiment, the email client includes a folder management screen, a message listing screen, a message detail screen, and an attachment screen. Additionally, the email client may be responsive to received gesture inputs to navigate with respect to the screens and/or perform actions with respect to one or more elements (e.g., messages) of the various screens.

15 Claims, 30 Drawing Sheets

Related U.S. Application Data

(60) Provisional application No. 61/458,150, filed on Nov. 17, 2010.

(51) Int. Cl.

| | | |
|---|---|---|
| *G06F 3/14* | (2006.01) | |
| *G09G 5/14* | (2006.01) | |
| *G09G 5/38* | (2006.01) | |
| *G06Q 10/10* | (2012.01) | |
| *G06F 3/0482* | (2013.01) | |
| *H04L 12/58* | (2006.01) | |
| *H04M 1/725* | (2006.01) | |
| *G06F 3/0484* | (2013.01) | |
| *G06F 3/0488* | (2013.01) | |

(52) U.S. Cl.
CPC .......... *G06F 3/0482* (2013.01); *G06F 3/0488* (2013.01); *G06F 3/04842* (2013.01); *G06F 3/04845* (2013.01); *G06F 3/04883* (2013.01); *G06F 3/04886* (2013.01); *G06F 3/1423* (2013.01); *G06Q 10/107* (2013.01); *G09G 5/14* (2013.01); *G09G 5/38* (2013.01); *H04L 51/08* (2013.01); *H04L 51/38* (2013.01); *H04M 1/72583* (2013.01); *G06F 2203/04803* (2013.01); *G09G 2340/0464* (2013.01); *G09G 2340/145* (2013.01); *G09G 2354/00* (2013.01)

(58) Field of Classification Search
CPC .... G06F 3/017; G06F 3/0482; G06F 3/04842; G06F 3/04845; G06F 3/0488; G06F 3/04883; H04L 51/00–38; H04L 51/08; H04L 51/38; G06Q 10/107; G09G 5/14; G09G 5/38; G09G 2340/0464; G09G 2340/145; G09G 2354/00; H04M 1/72583
See application file for complete search history.

(56) References Cited

U.S. PATENT DOCUMENTS

| | | |
|---|---|---|
| 7,730,081 B2 | 6/2010 | Bromm et al. |
| 8,266,550 B1 | 9/2012 | Cleron et al. |
| 9,189,773 B2 | 11/2015 | Webber |
| 9,208,477 B2 | 12/2015 | Webber |
| 9,235,828 B2 | 1/2016 | Webber |
| 2002/0015064 A1 | 2/2002 | Robotham et al. |
| 2002/0089550 A1 | 7/2002 | Orbanes et al. |
| 2003/0007464 A1 | 1/2003 | Balani |
| 2004/0095401 A1 | 5/2004 | Tomimori |
| 2004/0119763 A1 | 6/2004 | Mizobuchi et al. |
| 2006/0236014 A1 | 10/2006 | Yin et al. |
| 2007/0075915 A1 | 4/2007 | Cheon et al. |
| 2007/0192708 A1 | 8/2007 | Lee et al. |
| 2007/0285401 A1 | 12/2007 | Ohki et al. |
| 2008/0094369 A1 | 4/2008 | Ganatra et al. |
| 2008/0098402 A1 | 4/2008 | Lee et al. |
| 2008/0122796 A1 | 5/2008 | Jobs et al. |
| 2008/0150919 A1* | 6/2008 | Kanamaru ............ G06F 1/1654 345/179 |
| 2008/0204424 A1 | 8/2008 | Jin et al. |
| 2008/0273297 A1 | 11/2008 | Kumar |
| 2008/0320197 A1 | 12/2008 | Kumar |
| 2009/0228792 A1 | 9/2009 | van Os et al. |
| 2009/0228807 A1 | 9/2009 | Lemay |
| 2009/0265662 A1 | 10/2009 | Bamford |
| 2009/0278806 A1 | 11/2009 | Duarte et al. |
| 2009/0303676 A1 | 12/2009 | Behar et al. |
| 2010/0060587 A1 | 3/2010 | Freund |
| 2010/0081475 A1 | 4/2010 | Chiang et al. |
| 2010/0182247 A1 | 7/2010 | Petschnigg et al. |
| 2010/0235045 A1 | 9/2010 | Craig et al. |
| 2010/0248788 A1 | 9/2010 | Yook et al. |
| 2010/0251162 A1 | 9/2010 | Stallings et al. |
| 2010/0302179 A1 | 12/2010 | Ahn et al. |
| 2011/0209098 A1 | 8/2011 | Hinckley et al. |
| 2011/0265031 A1 | 10/2011 | Chiu et al. |
| 2012/0084644 A1 | 4/2012 | Robert et al. |
| 2012/0240055 A1 | 9/2012 | Webber |
| 2012/0266082 A1 | 10/2012 | Webber |
| 2012/0290946 A1 | 11/2012 | Schrock et al. |
| 2012/0317515 A1 | 12/2012 | Wang et al. |
| 2013/0021262 A1 | 1/2013 | Chen |
| 2016/0062631 A1 | 3/2016 | Webber |

FOREIGN PATENT DOCUMENTS

| | | |
|---|---|---|
| JP | 2005-192092 | 7/2005 |
| WO | WO 03/077096 | 9/2003 |

OTHER PUBLICATIONS

"Lapdock™ for Motorola ATRIX," at www.motorola.com/Consumers/US-EN/Consumer-Product-and-Services/Mobile . . . , accessed Apr. 18, 2011, 1 page.
"Motorola ATRIX 4G Laptop Dock Review," at www.phonearena.com/reviews/Motorola-ATRIX-4G-Laptop-Dock-Review_id2667, Mar. 2, 2011, 6 pages.
Burns, "Motorola ATRIX 4G Laptop Dock Review," at www.androidcommunity.com/motorola-atrix-4g-laptop-dock-review-20110220/, Feb. 20, 2011, 5 pages.
Catacchio, "This smartphone has two huge screens . . . that rotate," The Next Web at www.thenextweb.com/asia/2010/10/07/this-smartphone-has-two-huge-screens-that-rotate/, Jul. 21, 2011, 2 pages.
Harman03, "Kyocera Echo Dual-screen Android Phone," posted 4 weeks from Apr. 18, 2011, 3 pages.
Stein, S., "How does the Motorola Atrix 4G Lapdock compare with a laptop?" Crave—CNET, at www.news.cnet.com/8301-17938_105-20031251-1.html, Feb. 9, 2011, 7 pages.
Zhu et al., "Correlated Multi-Screen Display Technology of Power System," 3D Int'l Conference on Electric Utility Deregulation and Restructuring and Power Technologies, Apr. 6-9, 2008, Nanjing, China, pp. 2007-2011.
International Search Report for International Patent Application No. PCT/US2011/061249, dated Jul. 27, 2012, 7 pages.
Written Opinion for International Patent Application No. PCT/US2011/061249, dated Jul. 27, 2012, 5 pages.
International Preliminary Report on Patentability for International Patent Application No. PCT/US2011/061249, dated May 30, 2013, 7 pages.
Extended European Search Report for European Patent Application No. 11841176.8, dated Apr. 1, 2014, 7 pages.
Official Action for U.S. Appl. No. 13/299,265, dated Sep. 12, 2013, 35 pages.
Final Action for U.S. Appl. No. 13/299,265, dated Nov. 22, 2013, 37 pages.
Official Action for U.S. Appl. No. 13/299,265, dated Jun. 4, 2014, 38 pages.
Final Action for U.S. Appl. No. 13/299,265, dated Oct. 2, 2014, 45 pages.
Official Action for U.S. Appl. No. 13/299,265, dated Apr. 8, 2015, 46 pages.
Final Action for U.S. Appl. No. 13/299,265, dated Jun. 15, 2015, 45 pages.
Official Action for U.S. Appl. No. 13/299,271, dated Sep. 11, 2013, 35 pages.
Final Action for U.S. Appl. No. 13/299,271, dated Jan. 6, 2014, 38 pages.
Official Action for U.S. Appl. No. 13/299,271, dated Jul. 29, 2014, 37 pages.
Final Action for U.S. Appl. No. 13/299,271, dated Dec. 23, 2014, 36 pages.
Official Action for U.S. Appl. No. 13/299,275, dated Sep. 11, 2013, 33 pages.
Final Action for U.S. Appl. No. 13/299,275, dated Nov. 21, 2013, 35 pages.

(56) References Cited

OTHER PUBLICATIONS

Official Action for U.S. Appl. No. 13/299,275, dated May 16, 2014, 40 pages.
Final Action for U.S. Appl. No. 13/299,275, dated Jun. 19, 2014, 45 pages.
Official Action for U.S. Appl. No. 13/299,275, dated Jan. 7, 2015, 46 pages.
Final Action for U.S. Appl. No. 13/299,275, dated Apr. 15, 2015, 49 pages.
Official Action for U.S. Appl. No. 13/299,279, dated Nov. 5, 2013, 20 pages.
Official Action for U.S. Appl. No. 13/299,279, dated Mar. 7, 2014, 36 pages.
Official Action for U.S. Appl. No. 13/299,279, dated Sep. 22, 2014, 40 pages.
Final Action for U.S. Appl. No. 13/299,279, dated Mar. 4, 2015, 46 pages.
Notice of Allowance for U.S. Appl. No. 13/299,279, dated May 26, 2015, 22 pages.
Official Action for U.S. Appl. No. 13/299,284, dated Oct. 25, 2013, 19 pages.
Final Action for U.S. Appl. No. 13/299,284, dated Dec. 19, 2013, 22 pages.
Official Action for U.S. Appl. No. 13/299,284, dated Jun. 4, 2014, 24 pages.
Official Action for U.S. Appl. No. 13/299,284, dated Mar. 25, 2015, 31 pages.
Official Action for U.S. Appl. No. 13/299,203, dated Mar. 17, 2014, 41 pages.
Final Action for U.S. Appl. No. 13/299,203, dated Aug. 29, 2014, 58 pages.
Official Action for U.S. Appl. No. 13/299,203, dated Jul. 29, 2015, 61 pages.
Official Action for U.S. Appl. No. 13/299,203, dated Nov. 20, 2015 61 pages.
Official Action for European Patent Application No. 11841176.8, dated Jul. 20, 2016 6 pages.
Notice of Allowance for U.S. Appl. No. 13/299,265, dated Aug. 27, 2015, 22 pages.
Examiner's Answer to Appeal Brief for U.S. Appl. No. 13/299,271, mailed Sep. 16, 2015 11 pages.
Notice of Allowance for U.S. Appl. No. 13/299,284, dated Jul. 27, 2015, 20 pages.
English Translation of Official Action for China Patent Application No. 201180055499.0, dated Nov. 17, 2015 13 pages.
Official Action for Japan Patent Application No. 2013-540030, dated Nov. 24, 2015 8 pages.
Mamezo Corporation, Ltd. Google Android Introduction to Programming, ASCII Media Works, Feb. 12, 2010, the first edition, p. 290 (Japanese only).
"We will solve your doubts Question & Answer 12th," Mac People, Aug. 28, 2010, vol. 16, No. 10, p. 160 (Japanese only).
"You are not bothering to send and receive another e-mail Outlook Express5 ironclad guide," Internet ASCII, Oct. 1, 1999, vol. 11, pp. 116-126 (Japanese only).
Decision on Appeal for U.S. Appl. No. 13/299,271, mailed Jul. 5, 2017 7 pages.
Official Action for U.S. Appl. No. 14/844,870, dated Feb. 15, 2018, 47 pages.
U.S. Appl. No. 16/155,696, filed Oct. 9, 2018, Webber.
Final Action for U.S. Appl. No. 14/844,870, dated Jul. 16, 2018, 44 pages.

\* cited by examiner

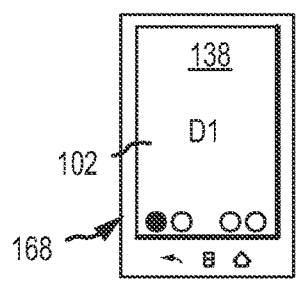
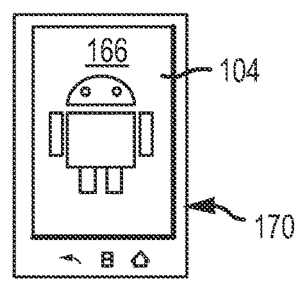
FIG.3A  FIG.3B
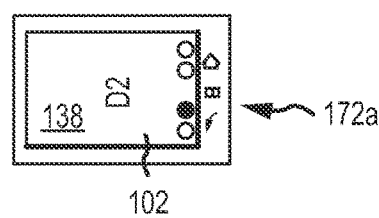
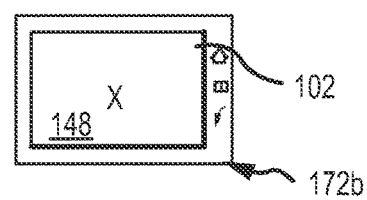
FIG.3C  FIG.3D
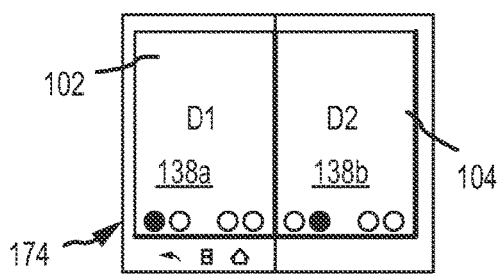
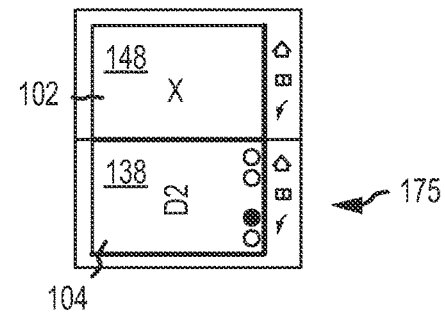
FIG.3E  FIG.3F

MULTI-SCREEN EMAIL CLIENT

CROSS REFERENCE TO RELATED APPLICATIONS

This application is a continuation of and claims priority to U.S. patent application Ser. No. 13/299,203, filed Nov. 17, 2011, of the same title, which claims priority to U.S. Provisional Patent Application No. 61/458,150 filed Nov. 17, 2010 entitled "DUAL SCREEN EMAIL CLIENT", each of which is incorporated by reference in their entirety for all that they teach and for all purposes.

BACKGROUND

As the computing and communication functions of handheld computing devices become more powerful, the user interface and display elements of such devices have evolved by attempting to adapt user interface regimes developed for personal computers for use with handheld computing devices. However, the attempt to adapt prior user interface regimes has been met with various hurdles.

For instance, many current handheld computing devices make use of a physical keypad for user interface. Many different implementations of physical keypads exist that vary in orientation and relationship to the device screen. However, in every case the physical keypads take up a certain percentage of the physical space of the device and increase the weight of the device. In addition to the disadvantages of size and weight, physical keypads are not configurable in the same manner as a touch screen based user interface. While certain limited forms of physical keypads currently have, on the keys themselves, configurable displays, such as eInk or OLED surfaces, to allow for reconfiguration of the keys, even in these cases, the physical layout of keys is not modifiable. Rather, only the values associated with the physical keys on the keypad may be changed.

Other methods may provide increased user configurability of physical keypads. These methods may include stickers and/or labels that can be added to keys to reference modified functions or plastic overlays on top of the keypad denoting different functional suites. For instance, the ZBoard keyboard, meant for laptop or desktop computer use, incorporates a dual layered physical keyboard which separates the keys and their layout from the connections which send signals to the machine. As such, different physical keyboard inserts for different applications can be inserted into a holder allowing full configurability such that the orientation and layout of the keys in addition to their denotation of function is configurable. This model could be extended to handheld computing devices; however, the rate at which such a modular keypad can change functions is much slower and more labor intensive than with a touch screen user interface. Furthermore, for each potential functional suite, an additional physical key layout must be carried by the user, greatly increasing the overall physical size and weight of such implementations. One advantage of a physical keypad for handheld computing devices is that the user input space is extended beyond the user display space such that none of the keys themselves, the housing of the keys, a user's fingers, or a pointing device obscure any screen space during user interface activities.

A substantial number of handheld computing devices make use of a small touch screen display to deliver display information to the user and to receive inputs from the user interface commands. In this case, while the configurability of the device may be greatly increased and a wide variety of user interface options may be available to the user, this flexibility comes at a price. Namely, such arrangements require shared screen space between the display and the user interface. While this issue is shared with other types of touch screen display/user interface technology, the relatively small form factor of handheld computing devices results in a tension between the displayed graphics and area provided for receiving inputs. For instance, the small display further constrains the display space, which may increase the difficulty of interpreting actions or results while a keypad or other user interface scheme is laid overtop or to the side of the applications in use such that the application is squeezed into an even smaller portion of the display. Thus a single display touch screen solution, which solves the problem of flexibility of the user interface may create an even more substantial set of problems of obfuscation of the display, visual clutter, and an overall conflict of action and attention between the user interface and the display.

Single display touch screen devices thus benefit from user interface flexibility, but are crippled by their limited screen space such that when users are entering information into the device through the display, the ability to interpret information in the display can be severely hampered. This problem is exacerbated in several key situations when complex interaction between display and interface is required, such as when manipulating layers on maps, playing a game, or modifying data received from a scientific application, etc. This conflict between user interface and screen space severely limits the degree to which the touch based user interface may be used in an intuitive manner.

SUMMARY

A first aspect includes a multi-screen email client executable on a handheld electronic device having at least a first display portion and a second display portion. The email client includes a first user interface screen portion displayable on the first display portion and a second user interface screen portion displayable on the second display portion. The first user interface screen portion and the second user interface screen portion are related by way of a dependency relationship therebetween and are operable to provide functionality related to the email client.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For example, the first display portion and the second display portion may be distinct display devices of the handheld device.

In one embodiment, one of the first and second user interface screen portions may be operable to at least partially control the execution of another of the first and second user interface screen portions. For example, one of the first and second user interface screen portions may include an input screen that is operable to receive inputs from a user for control of another of the first and second user interface screen portions. The input screen may be a keyboard screen.

In one embodiment, the first and second user interface screen portions may include different respective ones of a folder management screen, a message listing screen, a message detail screen, and an attachment screen. The folder management screen, the message listing screen, the message detail screen, or the attachment screen may define a hierarchical application sequence. Accordingly, the hierarchical application sequence may be navigable by a user to display at least a different one of the screens of the hierarchical application sequence on at least one of the first or second display portions in response to a user input. Additionally, the first user interface screen portion may include an indicator regarding a portion of the first user interface screen portion to which the second user interface screen portion corresponds.

In one embodiment, at least one of the first and second user interface screen portions may be a message listing screen, and a plurality of messages appearing in the message listing screen may be sortable by at least one of a sender, a subject matter, or a time of receipt. In another embodiment, at least one of the first and second user interface screen portions may be a message listing screen, and a plurality of messages appearing in the message listing screen may be selectable in order to perform an action on the selected messages collectively. In still another embodiment, at least one of the first and second user interface screen portions may be a message detail screen, and an element of the message detail screen may be responsive to a user input to initiate an action with respect to the element. The action may be indicated by way of a change in appearance of the element of the message detail screen. For example, the element may be an attachment bar and the action may include downloading an attached file corresponding to the attachment bar such that the appearance of the attachment bar may correspond to a status of the downloading of the attached file. In yet another embodiment, at least one of the first and second user interface screen portions may be a message detail screen, and the message detail screen may be selectively modifiable to invert the color of text and a background of a message displayed in the message detail screen. Further still, at least one of the first and second user interface screen portions may be a message detail screen, and the message detail screen may be selectively viewable in a full screen mode such that at least one element of the message detail screen is removed when displayed in the full screen mode.

In another embodiment, an indication may be presentable to user upon loss of connectivity with an email server with which an email account is associated.

A second aspect includes a method of operation of a multi-screen email client. The method includes executing the multi-screen email client on a handheld electronic device having at least a first display portion and a second display portion and displaying a first user interface screen portion on the first display portion and a second user interface screen on the second display potion. The first user interface screen portion and the second user interface screen portion are related by way of a dependency relationship therebetween. The method further includes receiving inputs from a user with respect to the first user interface screen portion on the first display portion and with respect to the second user interface screen portion on the second display portion and controlling the execution of the email client in response to the receiving.

A number of feature refinements and additional features are applicable to the second aspect. These feature refinements and additional features may be used individually or in any combination. As such, each of the following features that will be discussed may be, but are not required to be, used with any other feature or combination of features of the second aspect.

For example, in one embodiment, the first display portion and the second display portion may be distinct display devices of the handheld device.

In one embodiment, the method may further include affecting the execution of one of the first and second user interface screen portions in response to receiving inputs from a user with respect to another of the first and second user interface portions. One of the first and second user interface screen portions may includes an input screen operable to receive inputs from a user for affecting at least a portion of another of the first and second user interface screen portions. For example, the input screen may be a keyboard screen.

In various embodiments, the first and second user interface screen portion may be different respective ones of a folder management screen, a message listing screen, a message detail screen, or an attachment screen. The folder management screen, the message listing screen, the message detail screen, and the attachment screen may define a hierarchical application sequence. The method may further include navigating the hierarchical application sequence to display at least a different one of the screens of the hierarchical screen progression on at least one of the first or second display portions in response to the receiving of a user input. The method may also include indicating to a user a portion of the first user interface screen portion to which the second user interface screen portion corresponds.

In one embodiment, at least one of the first and second user interface screen portions may be the message listing screen, and a plurality of messages appearing in the message listing screen may be sortable by at least one of a sender, a subject matter, or a time of receipt. In another embodiment, at least one of the first and second user interface screen portions may be the message detail screen, and the method may further include initiating an action with respect to an element of the message detail screen in response to the receiving a user input and changing the appearance of the element of the message detail screen in response to the initiating. For example, the element may be an attachment bar and the action includes downloading an attached file corresponding to the attachment bar, and the appearance of the attachment bar may correspond to a status of the downloading of the attached file.

The method may further include receiving a gesture input from the user and, in response to receiving the gesture input, performing an action with respect to a message. The gesture input may include a long press gesture received with respect to a message displayed in at least one of a message listing screen or a message details screen, and the action may includes displaying a contextual menu related to the message. The gesture input may include a swipe gesture received with respect to a message displayed in at least one of a message listing screen or a message detail screen, and the action may include moving the message to a location in the email client different than the current location of the message. For example, the moving may include movement of the message to a destination folder. The destination folder may be at least partially determined by the nature of the gesture input received.

A third aspect includes a handheld electronic device operable to execute a multi-screen email client. The device includes a plurality of user interface screen portions, wherein the plurality of user interface screen portion include at least one of a message listing screen or a message detail screen and a plurality of display portions operable to display different respective ones of the plurality of user interface screens of the multi-screen email client thereon. The device also includes at least one input device operable to receive a gesture input from a user, wherein the plurality of user interface screen portions are responsive to received gesture inputs at the at least one input device to control the operation of the email client. Accordingly, upon receipt of a gesture from the user at the input device, the email client is operable to perform an action with respect to a message displayed in the message listing screen or the message detail screen to modify the message.

A number of feature refinements and additional features are applicable to the third aspect. These feature refinements and additional features may be used individually or in any combination. As such, each of the following features that will be discussed may be, but are not required to be, used with any other feature or combination of features of the third aspect.

For example, the gesture may include a long press gesture received with respect to a message displayed in at least one of the message listing screen or the message detail screen, and the action may include display of a contextual menu related to the message. Additionally or alternatively, the gesture may include a swipe gesture received with respect to a message displayed in at least one of the message listing screen or the message detail screen, and the action may include moving the message in the message listing screen or the message details screen within the email client. The moving may include movement of the message to a destination folder. For example, the destination folder may be at least partially determined by the nature of the gesture input received. In another embodiment, the gesture input may comprise a drag-and-drop gesture to move a message from a source folder to a destination folder.

A fourth aspect includes a handheld electronic device that includes a memory operable to store a plurality of programs and a plurality of files. At least a portion of the files are executable by one or more of the plurality of programs. The device further includes a processor operable to run the plurality of programs to execute the at least a portion of the files. The device includes at least one file in a non-executable file format not executable or capable of being opened by any of the plurality of programs. Furthermore, the device includes a file transfer module operable to transmit and receive the at least one non-executable file.

A number of feature refinements and additional features are applicable to the fourth aspect. These feature refinements and additional features may be used individually or in any combination. As such, each of the following features that will be discussed may be, but are not required to be, used with any other feature or combination of features of the fourth aspect.

For example, in one embodiment, at least one of the plurality of programs may include an email client operable to transmit email messages from and receive email messages at the device. Accordingly, at least one of the email messages may include a file attachment, and the attached file may be the at least one non-executable file.

A fifth aspect includes a method of operation of a handheld electronic device. The method includes storing a plurality of programs in a memory of the handheld electronic device and executing one or more of the plurality of programs on a microprocessor in operative communication with the memory. The method further includes receiving a non-executable file at the handheld electronic device, wherein the non-executable file is in a file format that is not associated with any of the plurality of programs. Furthermore, the method includes storing the file in the memory of the handheld device.

A number of feature refinements and additional features are applicable to the fifth aspect. These feature refinements and additional features may be used individually or in any combination. As such, each of the following features that will be discussed may be, but are not required to be, used with any other feature or combination of features of the fifth aspect.

For example, in one embodiment, at least one of the plurality of programs may include an email client operable to transmit email messages from and receive email messages at the device. Accordingly, at least one of the email messages may includes a file attachment, and wherein the attached file is the non-executable file.

BRIEF DESCRIPTION OF THE DRAWINGS

FIGS. 3A-K are graphical representations of an embodiment of a handheld computing device provided in different positions, orientations, and instances of operation.

DETAILED DESCRIPTION

The present disclosure is generally related to an email client executable on a handheld electronic device that includes a plurality of display portions. Accordingly, a plurality of screens of the email client may be simultaneously displayed in the various display portions of the handheld electronic device. Additionally, gesture inputs for interaction with the email client may be received. The interface and controls of the email client may be particularly suited for control of devices that have one or more displays capable of displaying graphical user interfaces (GUIs) on a handheld portable electronic device. The following disclosure may, in various embodiments, be applied to other computing devices capable of displaying and responding to a GUI (e.g., laptop computers, tablet computers, desktop computers, touch screen monitors, etc.) and is not intended to be limited to handheld computing devices unless otherwise explicitly specified.

Figure 1:
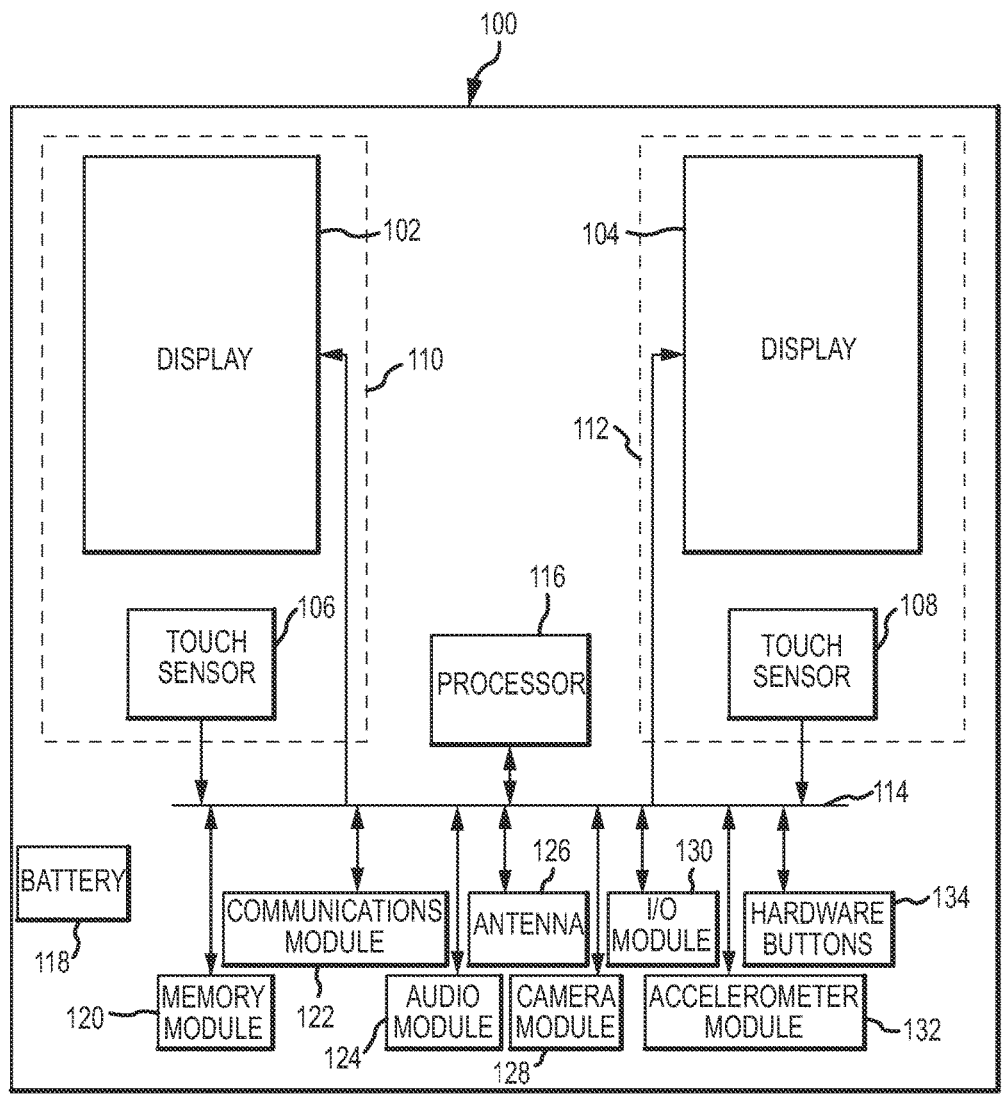
FIG. 1 is a schematic view of an embodiment of a handheld computing device.

FIG. 1 depicts an embodiment of a handheld computing device 100. The handheld computing device 100 may include a first display 102 and a second display 104. Additionally, while two displays (102, 104) may be shown and described below with regard to the functionality of various embodiments of handheld computing devices, a handheld computing device may be provided that includes more than two displays. In any regard, the first display 102 and the second display 104 may be independently controllable. The displays may be operative to display a displayed image or "screen". As used herein, the term "display" refers to device hardware, whereas "screen" refers to the displayed image produced on the display. In this regard, a display is a physical hardware device that is operable to render a screen. A screen may encompass a majority of the display. For instance, a screen may occupy substantially all of the display area except for areas dedicated to other functions (e.g., menu bars, status bars, an annunciator bar etc.) A screen may be associated with an application, an operating system, or other software program executing on the handheld computing device 100. For instance, application screens or desktop screens may be displayed. An application may have various kinds of screens that are capable of being manipulated as will be described further below. In an embodiment, each display may have a resolution of 480 pixels by 800 pixels, although higher and lower resolution displays may also be provided.

In some instances, a screen may include interactive features (e.g., buttons, text fields, toggle fields, etc.) capable of manipulation by way of a user input. The user input may be received by various input devices (e.g., a physical keyboard, a roller ball, directional keys, a touch sensitive device, etc.). In some instances, a screen may simply include graphics and have no ability to receive an input by a user. In other instances, graphics features and input features may both be provided by a screen. As such, the one or more displays of a handheld computing device, the screens displayed on the one or more displays, and various user input devices may comprise a GUI that allows a user to exploit functionality of the handheld computing device.

The handheld computing device 100 may be configurable between a first position and a second position. In the first position, a single display (e.g., the first display 102 or the second display 104) may be visible from the perspective of a user. Both displays 102, 104 may be exposed on an exterior of the handheld device 100 when in the first position, but the displays 102, 104 may be arranged in a non-adjacent manner such that both displays 102, 104 are not concurrently visible from the perspective of a user (e.g., one display may be visible from the front of the device 100 and the other display may be visible from the back of the device 100).

The handheld computing device 100 may also be provided in the second position such that the displays 102, 104 may be concurrently viewable from the perspective of a user (e.g., the displays 102, 104 may be positioned adjacent to one another). The displays 102, 104 may be displayed in the second position such that the displays 102, 104 are arranged end-to-end or side-by-side. Additionally, the displays 102, 104 may be arranged in a portrait orientation or a landscape orientation with respect to a user. As will be discussed further below, a portrait orientation describes an arrangement of the handheld computing device, wherein the longer dimension of the display of the handheld computing device is vertically oriented (e.g., with respect to gravity or the perspective of a user). A landscape orientation describes an arrangement wherein the shorter dimension of the display of the handheld computing device is vertically oriented (e.g., with respect to gravity or the perspective of a user). Furthermore, the longer dimension and shorter dimension may refer to each display individually or the combined viewing area of the one or more displays of the device. Thus, when the individual displays are arranged in a portrait orientation, the overall display area (i.e., the collective display area of the individual displays) may be arranged in a landscape orientation, and vice versa. Additionally, the displays and screens may be in different respective orientations. For instance, when the displays are in a landscape orientation, one or more screens may be rendered in a portrait orientation on the displays or vice versa.

The handheld computing device 100 may be manipulated between the first position (i.e., a single display visible from a user's perspective) and the second position (i.e., at least two displays concurrently visible from the user's perspective) in a variety of manners. For instance, the device 100 may include a slider mechanism such that the first and second displays 102, 104 are disposable adjacent to one another in a parallel fashion in a second position and slideable to the first position where only a single display is viewable and the other display is obscured by the viewable display.

Alternatively, the device 100 may be arranged in a clam shell type arrangement wherein a hinge is provided between the first display 102 and the second display 104 such that the displays 102, 104 are concurrently visible by a user when in the second position (i.e., an open position). The displays 102, 104 may be provided on an interior clam shell portion or an exterior clam shell portion of the device 100. In this regard, both displays 102, 104 may be visible from the front and the back of the device, respectively, when the device is in the first position (i.e., the closed position). When the device 100 is in the open position, the displays 102, 104 may be provided adjacent and parallel to one another. Alternative arrangements of the handheld computing device 100 are contemplated wherein different arrangements and/or relative locations of the displays may be provided when in the first and second position.

In addition, the first display 102 and the second display 104 may be provided as entirely separate devices. In this regard, a user may manipulate the displays 102, 104 such that they may be positioned adjacent to one another (e.g., side-by-side or end-to-end). The displays 102, 104 may be in operative communication when adjacently positioned such that the displays 102, 104 may operate in the manner provided in greater detail below when adjacently positioned (e.g., via physical contacts, wireless communications, etc.). A retention member (not shown) may be provided to retain the separate displays 102, 104 in an adjacent position. For instance, the retention member may include coordinating magnets, mechanical clips or fasteners, elastic members, etc.

While the foregoing has referenced two displays 102 and 104, alternate embodiments of a handheld device may include more than two displays. In this regard, the two or more displays may behave in a manner in accordance with the foregoing wherein only a single display is viewable by a user in a first position and multiple displays (i.e., more than two displays) are viewable in a second position. Additionally, in one embodiment, the two displays 102 and 104 may comprise separate portions of a unitary display. As such, the first display 102 may be a first portion of the unitary display and the second display 104 may be a second portion of the unitary display. For instance, the handheld computing device 100 (e.g., having a first and second display 102 and 104) may be operatively connected to the unitary display (e.g., via a connector or a dock portion of the unitary display) such that the first display 102 and the second display 104 of the handheld computing device 100 are emulated on the unitary display. As such, the unitary display may have first and second portions corresponding to and acting in a similar manner to the first and second display 102 and 104 of the handheld computing device 100 described below.

The handheld computing device 100 may further include one or more input devices that may be used to receive user inputs. These input devices may be operative to receive gesture inputs from a user, and, accordingly, may be referred to as gesture sensors. A number of different types of gesture sensors may be provided. Some examples include, but are not limited to traditional input devices (keypads, trackballs, etc.), touch sensitive devices, optical sensors (e.g., a camera or the like), etc. The discussion contained herein may reference the use of touch sensitive devices to receive gesture inputs. However, the use of touch sensitive devices is not intended to limit the means for receiving gesture inputs to touch sensitive devices alone and is provided for illustrative purposes only. Accordingly, any of the foregoing means for receiving a gesture input may be used to produce the functionality disclosed below with regard to gesture inputs received at touch sensitive devices.

In this regard, the handheld computing device 100 may include at least a first touch sensor 106. Furthermore, the handheld computing device may include a second touch sensor 108. The first touch sensor 106 and/or the second touch sensor 108 may be touchpad devices, touch screen devices, or other appropriate touch sensitive devices. Examples include capacitive touch sensitive panels, resistive touch sensitive panels, or devices employing other touch sensitive technologies. The first touch sensor 106 and/or second touch sensor 108 may be used in conjunction with a portion of a user's body (e.g., finger, thumb, hand, etc.), a stylus, or other acceptable touch sensitive interface mechanisms known in the art. Furthermore, the first touch sensor 106 and/or the second touch sensor 108 may be multi-touch devices capable of sensing multiple touches simultaneously.

The first touch sensor 106 may correspond to the first display 102 and the second touch sensor 108 may correspond to the second display 104. In one embodiment of the handheld computing device 100, the first display 102 and the first touch sensor 106 comprise a first touch screen display 110. In this regard, the first touch sensor 106 may be transparent or translucent and positioned with respect to the first display 102 such that a corresponding touch received at the first touch sensor 106 may be correlated to the first display 102 (e.g., to interact with a screen rendered on the first display 102). Similarly, the second display 104 and the second touch sensor 108 may comprise a second touch screen display 112. In this regard, the second touch sensor 108 may be positioned with respect to the second display 104 such that a touch received at the second touch sensor 108 may be correlated to the second display 104 (e.g., to interact with a screen rendered on the second display 104). Alternatively, the first touch sensor 106 and/or the second touch sensor 108 may be provided separately from the displays 102, 104. Furthermore, in an alternate embodiment, only a single touch sensor may be provided that allows for inputs to control both the first display 102 and the second display 104. The single touch sensor may also be provided separately or integrally with the displays.

In this regard, the first and second touch sensors 106, 108 may have the substantially same footprint on the handheld computing device 100 as the displays 102, 104. Alternatively, the touch sensors 106, 108 may have a footprint including less of the entirety of the displays 102, 104. Further still, the touch sensors 106, 108 may include a footprint that extends beyond the displays 102, 104 such that at least a portion of the touch sensors 106, 108 are provided in non-overlapping relation with respect to the displays 102, 104. As discussed further below, the touch sensors 106, 108 may alternatively be provided in complete non-overlapping relation such that the footprint of the touch sensors 106, 108 is completely different than the footprint of the displays 102, 104.

Figure 6A:
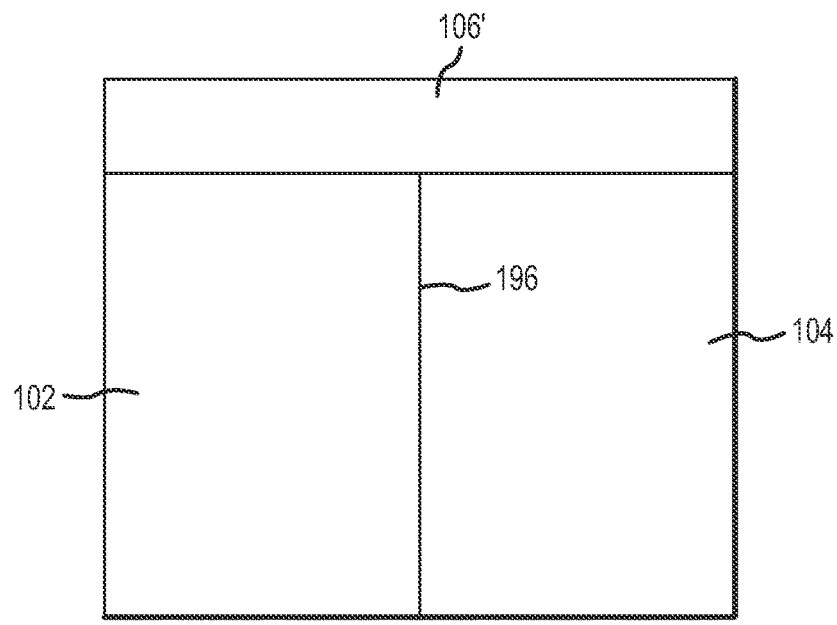
FIGS. 6A and 6B are schematic views of embodiments of a handheld computing device provided with touch sensitive devices.
Figure 6B:
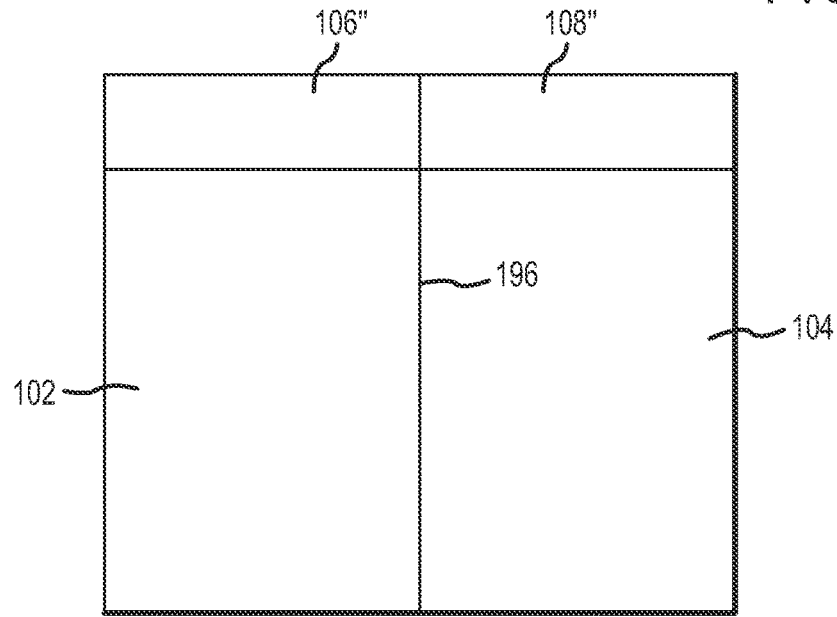

For example, with reference to FIGS. 6A and 6B, various potential arrangements are depicted for the first display 102, the second display 104, and touch sensors 106', 106'', and 108''. In FIG. 6A, the first 102 and second display 104 are arranged side-by-side such that a crease 196 separates the displays. In this regard, the first display 102 and second display 104 may be arranged in a clam-shell type arrangement such that the crease 196 includes a hinge that allows for pivotal movement between the first displays 102 and second display 104 as discussed above. A touch sensor 106' may span the width of both the first display 102 and the second display 104. In this regard, the touch sensor 106' may span the crease 196 without interruption. Alternatively, as shown in FIG. 6B, separate touch sensors 106'' and 108'' may be provided on either side of the crease 196. In this regard, each of the touch sensors 106'' and 108'' may span the width of each of the first display 102 and second display 104, respectively.

In any of the arrangements shown in FIGS. 6A and 6B, the displays (102, 104) may comprise touch screen displays that may be used in conjunction with touch sensitive portions that are provided separately from the touch screen displays. Thus, displays 102 and 104 may both comprise touch screen displays and be provided in addition to touch sensitive devices 106', 106'', and 108'''. Accordingly, a combination of touch screen displays (e.g., 110, 112) and off display touch sensors (e.g., 106', 106'', 108''') may be provided for a single device. Touch inputs may be received at both a touch screen display (110, 112) and off display touch sensor (106', 106", 108"). In this regard, gestures received at an off screen display sensor may have a different functionality than the same gesture received at a touch screen display. Also, a touch sensitive device may be divided into a plurality of zones. The same gesture received in different zones may have different functionality. For instance, a percentage (e.g., 10%, 25%, etc.) of the touch sensitive device at the top or bottom of the display may be defined as a separate zone than the remainder of the touch sensitive device. Thus, a gesture received in this zone may have a different functionality than a gesture received in the remainder of the touch sensitive device.

Returning to FIG. 1, the handheld computing device 100 may further include a processor 116. The processor 116 may be in operative communication with a data bus 114. The processor 116 may generally be operative to control the functionality of the handheld device 100. For instance, the processor 116 may execute an operating system and be operative to execute applications. The processor 116 may be in communication with one or more additional components 120-134 of the handheld computing device 100 as will be described below. For instance, the processor 116 may be in direct communication with one more of the additional components 120-134 or may communicate with the one or more additional components via the data bus 114. Furthermore, while the discussion below may describe the additional components 120-134 being in operative communication with the data bus 114, in other embodiments any of the additional components 120-134 may be in direct operative communication with any of the other additional components 120-134. Furthermore, the processor 116 may be operative to independently control the first display 102 and the second display 104 and may be operative to receive input from the first touch sensor 106 and the second touch sensor 108. The processor 116 may comprise one or more different processors. For example, the processor 116 may comprise one or more application specific integrated circuits (ASICs), one or more field-programmable gate arrays (FPGAs), one or more general purpose processors operative to execute machine readable code, or a combination of the foregoing.

The handheld computing device may include a battery 118 operative to provide power to the various devices and components of the handheld computing device 100. In this regard, the handheld computing device 100 may be portable.

The handheld computing device 100 may further include a memory module 120 in operative communication with the data bus 114. The memory module 120 may be operative to store data (e.g., application data). For instance, the memory 120 may store machine readable code executable by the processor 116 to execute various functionalities of the device 100.

Additionally, a communications module 122 may be in operative communication with one or more components via the data bus 114. The communications module 122 may be operative to communicate over a cellular network, a Wi-Fi connection, a hardwired connection or other appropriate means of wired or wireless communication. The handheld computing device 100 may also include an antenna 126. The antenna 126 may be in operative communication with the communications module 122 to provide wireless capability to the communications module 122. Accordingly, the handheld computing device 100 may have telephony capability (i.e., the handheld computing device 100 may be a smartphone device).

An audio module 124 may also be provided in operative communication with the data bus 114. The audio module 124 may include a microphone and/or speakers. In this regard, the audio module 124 may be able to capture audio or produce sounds. Furthermore, the device 100 may include a camera module 128. The camera module 128 may be in operative communication with other components of the handheld computing device 100 to facilitate the capture and storage of images or video.

Additionally, the handheld computing device 100 may include an I/O module 130. The I/O module 130 may provide input and output features for the handheld computing device 100 such that the handheld computing device 100 may be connected via a connector or other device in order to provide syncing or other communications between the handheld computing device 100 and another device (e.g., a peripheral device, another computing device etc.).

The handheld computing device 100 may further include an accelerometer module 132. The accelerometer module 132 may be able to monitor the orientation of the handheld computing device 100 with respect to gravity. In this regard, the accelerometer module 132 may be operable to determine whether the handheld computing device 100 is substantially in a portrait orientation or landscape orientation. The accelerometer module 132 may further provide other control functionality by monitoring the orientation and/or movement of the handheld computing device 100.

The handheld computing device 100 may also include one or more hardware buttons 134. The hardware buttons 134 may be used to control various features of the handheld computing device 100. The hardware buttons 134 may have fixed functionality or may be contextual such that the specific function of the buttons changes during operation of the handheld computing device 100. Examples of such hardware buttons may include, but are not limited to, volume control, a home screen button, an end button, a send button, a menu button, etc.

With further reference to FIGS. 2A-D, various screens of an embodiment of a device are shown. While multiple screens may be shown, only one or a subset of the multiple screens may be shown on the displays of the device at any one moment. In this regard, a screen may be described in a relative location to the displays or other screens (e.g., to the left of a display, to the right of a display, under another screen, above another screen, etc.). These relationships may be logically established such that no physical display reflects the relative position. For instance, a screen may be moved off a display to the left. While the screen is no longer displayed on the display, the screen may have a virtual or logical position to the left of the display from which it was moved. This logical position may be recognized by a user and embodied in values describing the screen (e.g., values stored in memory correspond to the screen). Thus, when referencing screens in relative locations to other screens, the relationships may be embodied in logic and not physically reflected in the display of the device.

FIGS. 2A-D may display a number of different screens that may be displayed at various instances of operation of a handheld device and are not intended to be presented in any particular order or arrangement. Single screen applications and multi-screen applications may be provided. A single screen application describes an application that is capable of producing a screen that may occupy only a single display at a time. A multi-screen application describes an application that is capable of producing one or more screens that may simultaneously occupy multiple displays. Additionally, a multi-screen application may occupy a single display. In this regard, a multi-screen application may have a single screen mode and a multi-screen mode.

Figure 2A:
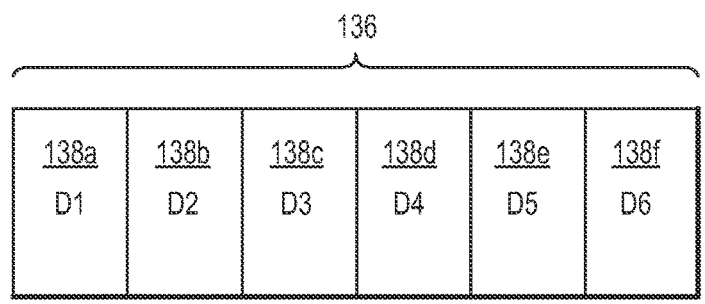
FIGS. 2A-D are graphical representations of an embodiment of a handheld computing device in various instances of operation.

A desktop sequence 136 is displayed in FIG. 2A. The desktop sequence 136 may include a number of individual desktop screens 138a-138f. Thus, each desktop screen 138 may occupy substantially the entirety of a single display (e.g., the first display 102 or second display 104 of FIG. 1). The desktop screens 138a-138f may be in a predetermined order such that the desktop screens 138a-138f appear consecutively and the order in which the desktop screens appear may not be reordered. However, the desktop screens 138a-138f may be sequentially navigated (e.g., in response to a user input). That is, one or more of the desktop screens 138a-138f may be sequentially displayed on a handheld device as controlled by a user input.

Figure 2B:
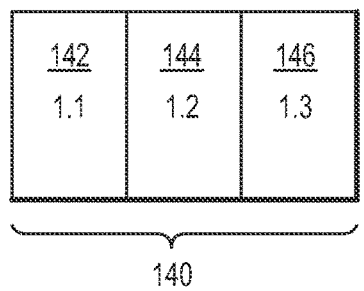
Figure 2C:
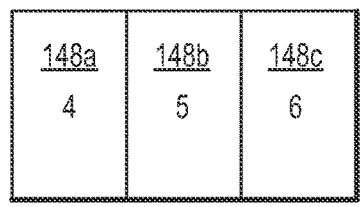

Additionally, FIG. 2B displays a hierarchal application sequence 140 of a multi-screen application. The hierarchal application sequence 140 may include a root screen 142, one or more node screens 144, and a leaf screen 146. The root screen 142 may be a top level view of the hierarchical application sequence 140 such that there is no parent screen corresponding to the root screen 142. The root screen 142 may be a parent to a node screen 144. One or more node screens 144 may be provided that are related to as parent/children. A node screen may also serve as a parent to a leaf screen 146. By leaf screen 146, it is meant that the leaf screen 146 has no corresponding node screen for which the leaf screen 146 is a parent. As such, the leaf screen does not have any children node screens 144. FIG. 2C depicts various single screen applications 148a, 148b, and 148c arranged sequentially. Each of these single screen applications may correspond to a different executing application. For instance, in FIG. 2C Application 4, Application 5, and Application 6 may be executing on the device and correspond to each single screen 148a, 148b, and 148c, respectively.

Figure 2D:

FIG. 2D also includes an empty view 166. The empty view 166 may be used during transitions of a screen (e.g., movement of screen between a first display and a second display). It is not necessary that the empty view 166 be interpretable by the user as an effective GUI screen. The empty view 166 merely communicates to the user that an action regarding the screen (e.g., the movement of the screen with respect to one or more displays) is occurring. An application displaying an empty view 166 need not be able to rest, wait, process or interpret input. The empty view 166 may display a screen, or a representation thereof, as it is being moved in proportion to the amount of the screen that has been moved from a first display to a second display as will be discussed in greater detail below. In this regard, the empty view 166 may be used to relate information regarding the position of a screen during a transition of the screen (e.g., in response to gesture). While shown in FIG. 2D as a grayed screen, an empty view 166 is only intended to refer to a screen not capable of receiving an input (e.g., a screen in transition). In this regard, the display of an empty view 166 may include an animation or the like showing the response of a screen as it is being moved or changed (e.g., modified into or out of a landscape mode).

Figure 3G:
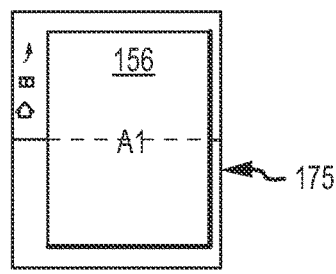
Figure 3H:
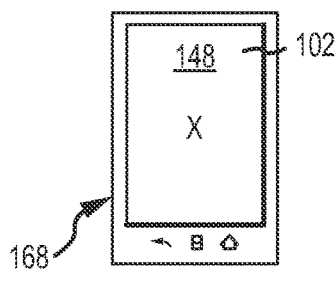

FIGS. 3A-K depict various arrangements and statuses of displays 102, 104 of a device that are possible in various embodiments of a handheld computing device according to the present disclosure. For instance, when in the first (e.g., closed) position, a closed front display 168 may be visible as shown in FIG. 3A. The closed front display 168 may correspond with the first display 102 or the second display 104. The closed front 168 as displayed may be occupied by a desktop screen D1 138 as shown in FIG. 3A. Alternatively, an application with a single screen or a multi-screen application in single screen mode may be displayed in the closed front 168. A closed back display 170 may be viewable from an opposite side of the display when the device is in a closed position, as shown in FIG. 3B. The closed back 170 may display a different desktop screen or application screen than the closed front 168 or may simply display an empty view 166 (e.g., displaying an icon or other graphic) and lack functionality as an interface.

FIG. 3C depicts a closed device in a landscape orientation 172a. In one embodiment, a landscape mode (i.e., wherein the display is adjusted to display a screen 148 in a landscape orientation) may not be enabled as shown in FIG. 3C. Alternatively, the landscape mode may be enabled such that the screen 148 is modified when the device is sensed in a landscape orientation 172b, such that the screen 148 is rendered in a landscape orientation as shown at FIG. 3D.

The device may further be provided in a second (e.g., open) position 174 as shown in FIG. 3E. In the open position 174, at least two displays 102, 104 are arranged such that the two displays 102, 104 are both visible from the vantage point of a user. The two displays 102, 104 may be arranged in a side-by-side fashion when in the open position 174. Thus, each of the two displays 102, 104 may display separate screens. For instance, the displays 102, 104 may each display a separate desktop screen 138a, 138b, respectively. While the individual displays 102 and 104 are in a portrait orientation as shown in FIG. 3E, it may be appreciated that the full display area (comprising both the first display 102 and the second display 104) may be arranged in a landscape orientation. Thus, whether the device as depicted in FIG. 3E is in a landscape or portrait orientation may depend on whether the displays are being used individually or collectively. If used collectively as a unitary display, the device may be in a landscape orientation, whereas if the displays are used separately, the orientation shown in FIG. 3E may be referred to as a portrait orientation.

Additionally, when the device is in an open position 174 as shown in FIG. 3F, a similar dependency with regard to the use of the screens as a unitary display or separate displays may also affect whether the device is in a portrait orientation or landscape orientation. As can be appreciated, each individual screen is in a landscape orientation, such that if the displays are used separately, the device may be in a landscape orientation. If used as a unitary display, the device may be in a portrait orientation. In any regard, as shown in FIG. 3F, a single screen 148 may occupy a first display 102 and the second display 104 may display a desktop screen 138. The single screen 148 may be displayed in a landscape or portrait mode. Alternatively, a device in an open orientation 172 may display a multi-screen GUI 156 that may occupy both displays 102, 104 in a portrait orientation as shown in FIG. 3G such that the individual displays are in a landscape orientation.

Figure 3I:
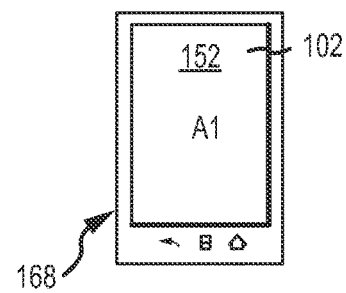
Figure 3J:
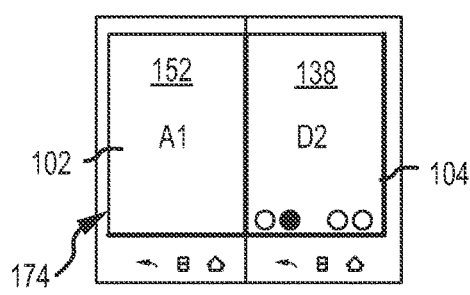
Figure 3K:
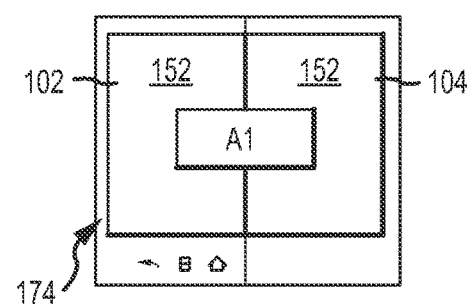

FIGS. 3I-K depict the potential arrangements of the screens of a multi-screen application 152. The multi-screen application 152 may, in one mode, occupy a single display 102 when the device is in a closed position 168 as shown in FIG. 3I. That is, the multi-screen application 152 may be in a single screen mode. Alternatively, when the device is in an open position as shown in FIG. 3J, the multi-screen application 152 may still occupy a single display 102 in single screen mode. Furthermore, the multi-screen application 152 may be expanded to occupy both displays 102, 104 when the device is in the open position as shown in FIG. 3K. In this regard, the multi-screen application 152 may also execute in a multi-screen mode. Various options may be provided for expanding the multi-screen application 152 from a single screen mode to a multi-screen mode.

For example, the multi-screen application 152 may be maximized from a single screen mode displayed in a single display to two screens displayed in two displays such that a parent screen is displayed in the first display and a node screen (e.g., a child screen) is expanded into the second display. In this regard, each of the screens displayed in the first and second display may be independent screens that comprise part of a hierarchical application sequence (e.g., as shown in FIG. 2B). Alternatively, the single screen mode of the multi-screen application may simply be scaled such that the contents of the single screen are scaled to occupy both displays. Thus, the same content displayed in the single screen is scaled to occupy multiple displays, but no additional viewing area or graphics are presented. Further still, the maximization of the multi-screen application from a single screen mode to a multi-screen mode may result in the expansion of the viewable area of the application. For example, if a multi-screen application is displayed in single screen mode, upon maximization into multi-screen mode, the viewable area of the multi-screen application may be expanded while the scale of the graphics displayed remains the same. In this regard, the viewable area of the multi-screen application may be expanded into the second display while the scaling remains constant upon expansion.

In this regard, an application may have configurable functionality regarding the nature and behavior of the screens of the application. For instance, an application may be configurable to be a single screen application or a multi-screen application. Furthermore, a multi-screen application may be configurable as to the nature of the expansion of the multi-screen application between a single screen mode and a multi-screen mode. These configuration values may be default values that may be changed or may be permanent values for various applications. These configuration values may be communicated to the device (e.g., the processor 116) to dictate the behavior of the application when executing on the device.

Figure 4:
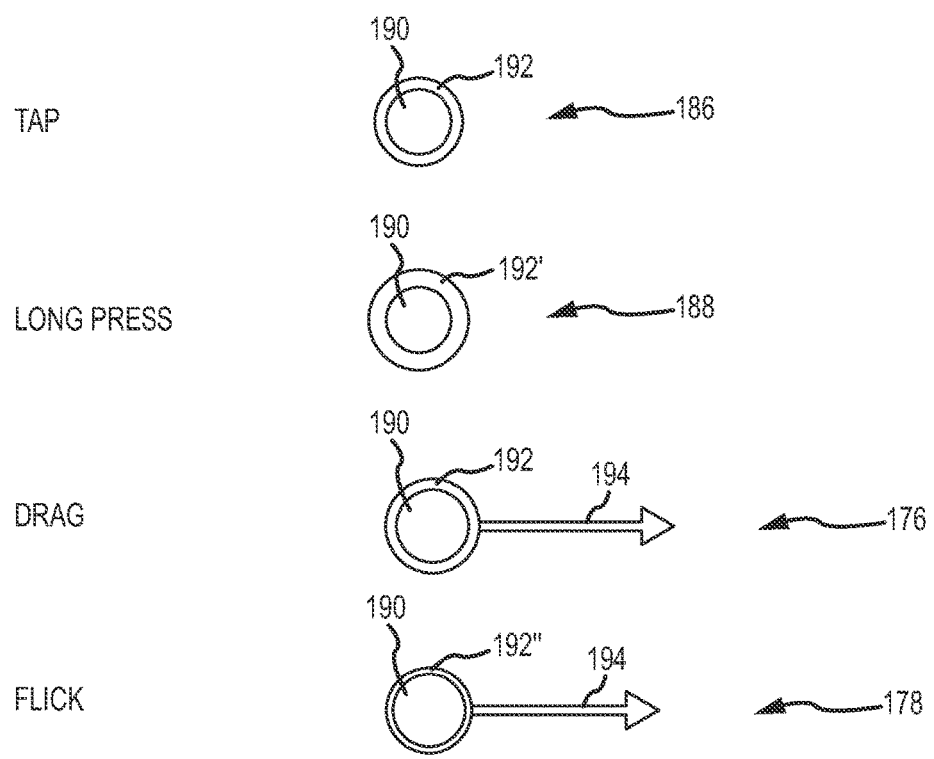
FIG. 4 includes graphical representations of various gesture inputs for controlling a handheld computing device.

FIG. 4 depicts various graphical representations of gesture inputs that may be recognized by a handheld computing device. Such gestures may be received at one or more touch sensitive portions of the device. In this regard, various input mechanisms may be used in order to generate the gestures shown in FIG. 4. For example, a stylus, a user's finger(s), or other devices may be used to activate the touch sensitive device in order to receive the gestures. The use of a gesture may describe the use of a truncated input that results in functionality without the full range of motion necessary to conventionally carry out the same functionality. For instance, movement of screens between displays may be carried out by selecting and moving the screen between displays such that the full extent of the motion between displays is received as an input. However, such an implementation may be difficult to accomplish in that the first and second displays may comprise separate display portions without continuity therebetween. As such, a gesture may truncate the full motion of movement or provide an alternative input to accomplish the same functionality. Thus, movement spanning the first and second display may be truncated so that the gesture may be received at a single touch sensitive device. The use of gesture inputs is particularly suited to handheld computing devices in that the full action of an input may be difficult to execute given the limited input and display space commonly provided on a handheld computing device.

With reference to FIG. 4, a circle 190 may represent a touch received at a touch sensitive device. The circle 190 may include a border 192, the thickness of which may indicate the length of time the touch is held stationary at the touch sensitive device. In this regard, a tap 186 has a thinner border 192 than the border 192' for a long press 188. The long press 188 may involve a touch that remains stationary on the touch sensitive display for longer than that of a tap 186. As such, different gestures may be registered depending upon the length of time that the touch remains stationary prior to movement.

A drag 176 involves a touch (represented by circle 190) with movement 194 in a direction. The drag 176 may involve an initiating touch that remains stationary on the touch sensitive device for a certain amount of time represented by the border 192. In contrast, a flick 178 may involve a touch with a shorter dwell time prior to movement than the drag as indicated by the thinner border 192" of the flick 178. Thus, again different gestures may be produced by differing dwell times of a touch prior to movement. The flick 178 may also include movement 194. The direction of movement 194 of the drag and flick 178 may be referred to as the direction of the drag or direction of the flick. Thus, a drag to the right may describe a drag 176 with movement 194 to the right.

In an embodiment, a swipe gesture having movement (e.g., a flick or drag gesture as described above) may be limited to movement in a single direction along a first axis. Thus, while movement in a direction different than along the first axis may be disregarded so long as contact with the touch sensitive device is unbroken. In this regard, once a gesture is initiated, movement in a direction not along an axis along which initial movement is registered may be disregarded or only the vector component of movement along the axis may be registered.

Figure 7:
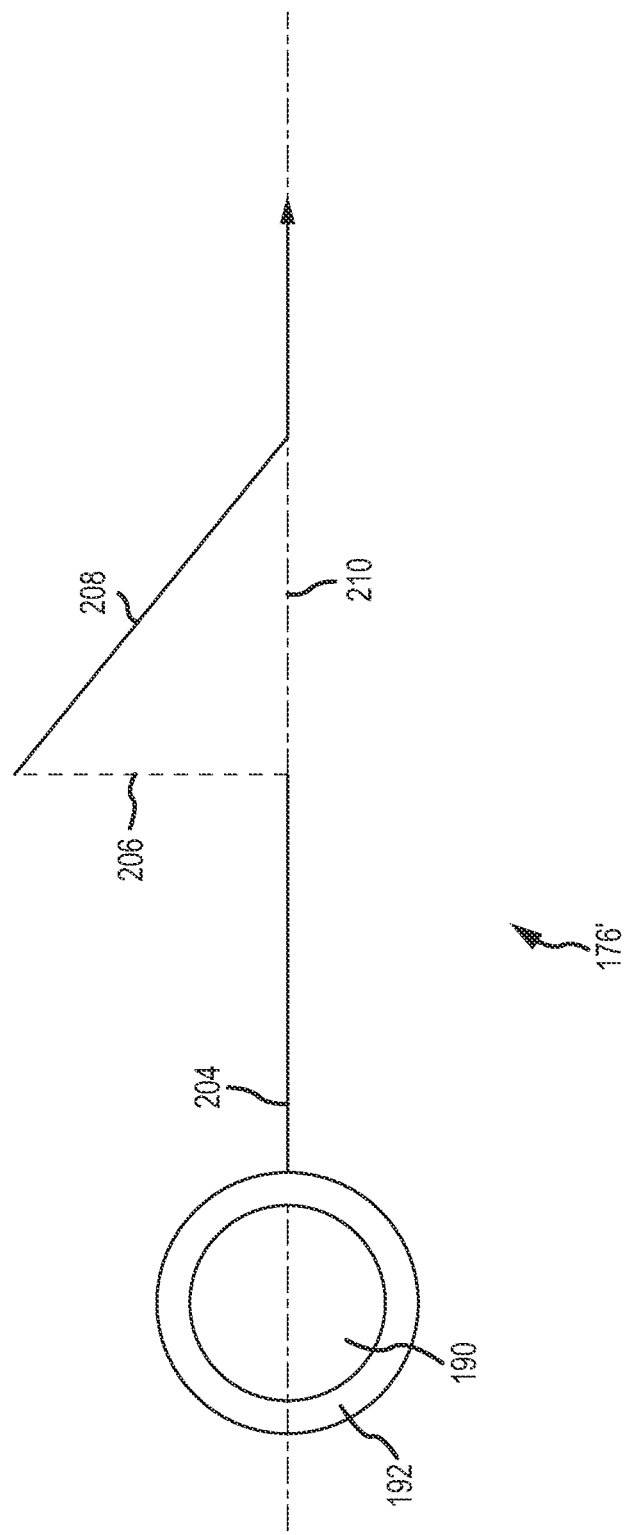
FIG. 7 is a graphical representation of an embodiment of a gesture input.

While the directional swipe gestures (e.g., the drag 176 and flick 178) shown in FIG. 4 include only horizontal motion after the initial touch, this may not be actual movement of the touch during the gesture. For instance, once the drag is initiated in the horizontal direction, movement in a direction other than in the horizontal direction may not result in movement of the screen to be moved in the direction different and the horizontal direction. For instance, with further reference to FIG. 7, the drag 176 from left to right may be initiated with initial movement 204 from left to right along an initiated direction 210. Subsequently, while maintaining contact with the touch sensitive device, the user may input an off direction movement 206 in a direction different than the initiated direction 210. In this regard, the off direction movement 206 may not result in any movement of a screen between two displays. Furthermore, the user may input partially off direction movement 208, where only a vector portion of the movement is in the direction of the initiated direction 210. In this regard, only the portion of the partially off direction movement 208 may result in movement of a screen between displays. In short, the movement of application screens between the first display 102 and the second display 104 may be constrained along a single axis along which the displays are arranged.

Figure 5:
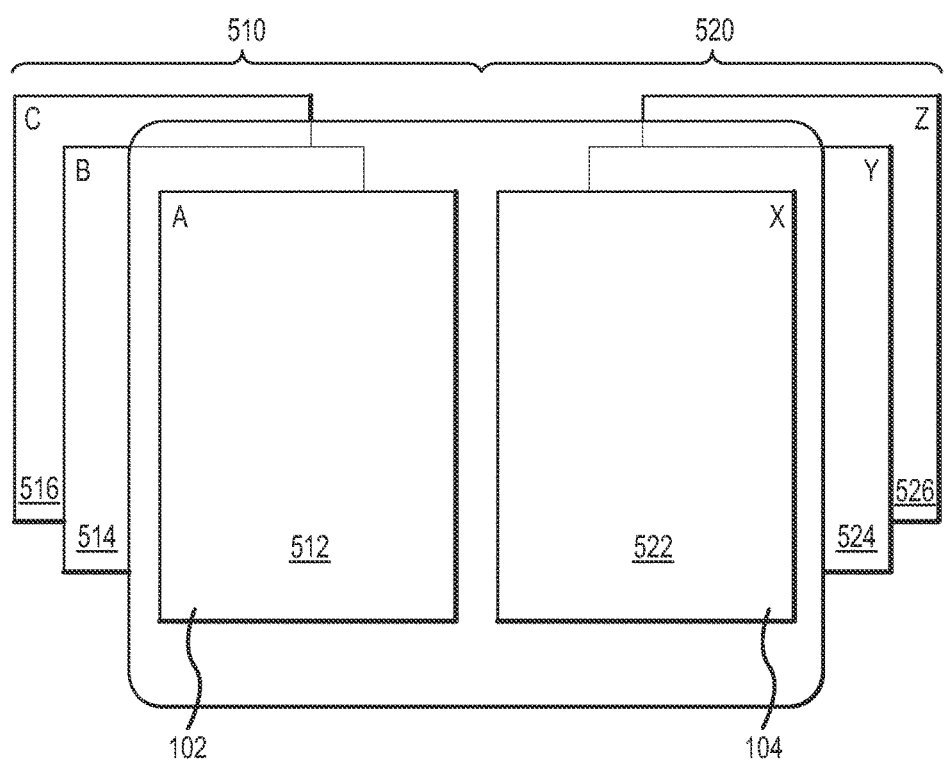
FIG. 5 is a graphical representation of the logical positions of screens executing on displays of an embodiment of a handheld computing device.

As referenced above, screens may be logically associated with a display and be logically arranged with respect to one another even though not all screens are physically rendered on a display. With additional reference to FIG. 5, this concept is further graphically represented. In FIG. 5, a first display 102 actively displays a first application screen (screen A 512). Additionally, a first application stack 510 is depicted. An application stack may be operative to maintain logical associations of a screen with a respective display. In addition, an application stack may logically maintain the relative positions of screens with respect to one another (i.e., the order of the screens in the application stack). In this regard, a screen may be logically disposed in an application stack associated with a display even though the screen may not be physically rendered on the display. A display controller or other control device (e.g., a processor, memory, or an operative combination thereof) may be operative to maintain the logical associations of screens. This may involve storing the logical association of the screen with a display and/or other screens in memory. As such, the logical associations of the screen with a display and with other screens may be logically maintained and/or changed even though the screen is not actively displayed.

For example, the first application stack 510 is comprised of screen A 512, screen B 514, and screen C 516 which are all logically associated with the first display 102. As shown, only screen A 512 from the application stack 510 is physically displayed. Screen B 514 and screen C 516 may belong to the first application stack 510 associated with the first display 102 and be logically positioned behind screen A 510 in the manner shown in FIG. 5. As such, screen B 514 and screen C 516 may be logically positioned behind screen A 512 such that screen B 514 and screen C 516 are not actively rendered on the first display 102. While each application belonging to the first application stack 510 is logically associated with the first display, applications that are not currently rendered in the display may suspend or close when not actively displayed. Alternatively, applications may continue to execute in the background, even though not displayed. Regardless, the non-displayed applications may continue to reside in the application stack 510 until otherwise closed or ended by a user.

A second application stack 520 may also be provided to maintain the logical associations of screens with respect to a second display 104. The second application stack 520 is comprised of screen X 522, screen Y 524, and screen Z 526 and may behave in a manner similar to the first application stack 510 described above. Each of screen A 512, screen B 514, screen C 516, screen X 522, screen Y 524, and screen Z 526 may correspond to individual applications. As shown, screen X 522 is currently displayed. While screen Y 524 and screen Z 526 are logically associated with the second display 104 and are logically positioned behind screen X 522 as shown in FIG. 5. Thus, while each application in the second application stack 520 is disposed in the second display 104, only one application may be actively rendered on the display.

The arrangement (i.e., logical associations) of the screens with respect to the displays and within the application stacks 510, 520 may be arrived at by various methods including manipulation of screens via drag gestures, opening a new application on top of an existing screen rendered on a display, or other means of manipulation whereby screens are moved between the first display 102 and the second display 104.

The general behavior described above regarding the control and positioning of a plurality of screens on a plurality of display devices of a handheld electronic device may be applied, in one particular embodiment, to an email client that is executable on a handheld electronic device. An email client may describe a program executable on a device that is operative to send and/or receive email messages. In connection with the transmission and receipt of email messages, the email client may include screens, for example, for displaying messages that are received and screens in which email messages may be generated.

In light of the difficulties in presenting information and receiving inputs from a user when using a single touch screen display on a handheld electronic device, the presentation of the multi-screen email client described herein may present additional display space in which information may be displayed or from which user inputs may be received. As such, at least some of the issues described above such as screen obfuscation and limited display space may be addressed by displaying different screen portions of the email client in different display portions of a handheld electronic device (e.g., the handheld computing device 100 described with respect to FIG. 1). For instance, the different screens of the email client displayed in different ones of the display portions may be related by way of a dependency relationship therebetween. For example, as described above, with respect to FIG. 2B, the email client may include root, parent, child, and leaf screens that are navigable by a user. For example, as will be discussed in greater detail below, selection of an element (e.g., a folder) in one screen (e.g., a folder management screen) may result in the display of the contents of that element in a child screen (e.g., a message listing screen). Thus, selection of various elements within the screens may be used to navigate a hierarchical application sequence defined by the email client. As the screens are displayable in distinct display portions, related screens (i.e., parent and child screens) may be simultaneously presented to a user. This may assist the user in maintaining location awareness in the hierarchical application sequence. That is, rather than displaying a screen without context, the parent screen to which a child screen pertains may be maintained in another of the display portions of the device, thus providing context to the screen.

The email client may be operable to communicate with one or more servers to communicate data to or from the device. For example, the email client may be operative to communicate with a server using a number of protocols such as, for example, IMAP, POP3, Microsoft Exchange, or other appropriate type of email protocol. In this regard, the client may be configurable to communicate with one or more email servers to send or receive email messages associated with one or more email accounts. In particular, the email client may be configured to communicate with one or more servers to send and receive messages corresponding to a plurality of different email accounts. The various email accounts for which the email client may be configured may send and receive messages using the same or different protocols.

Figure 8:
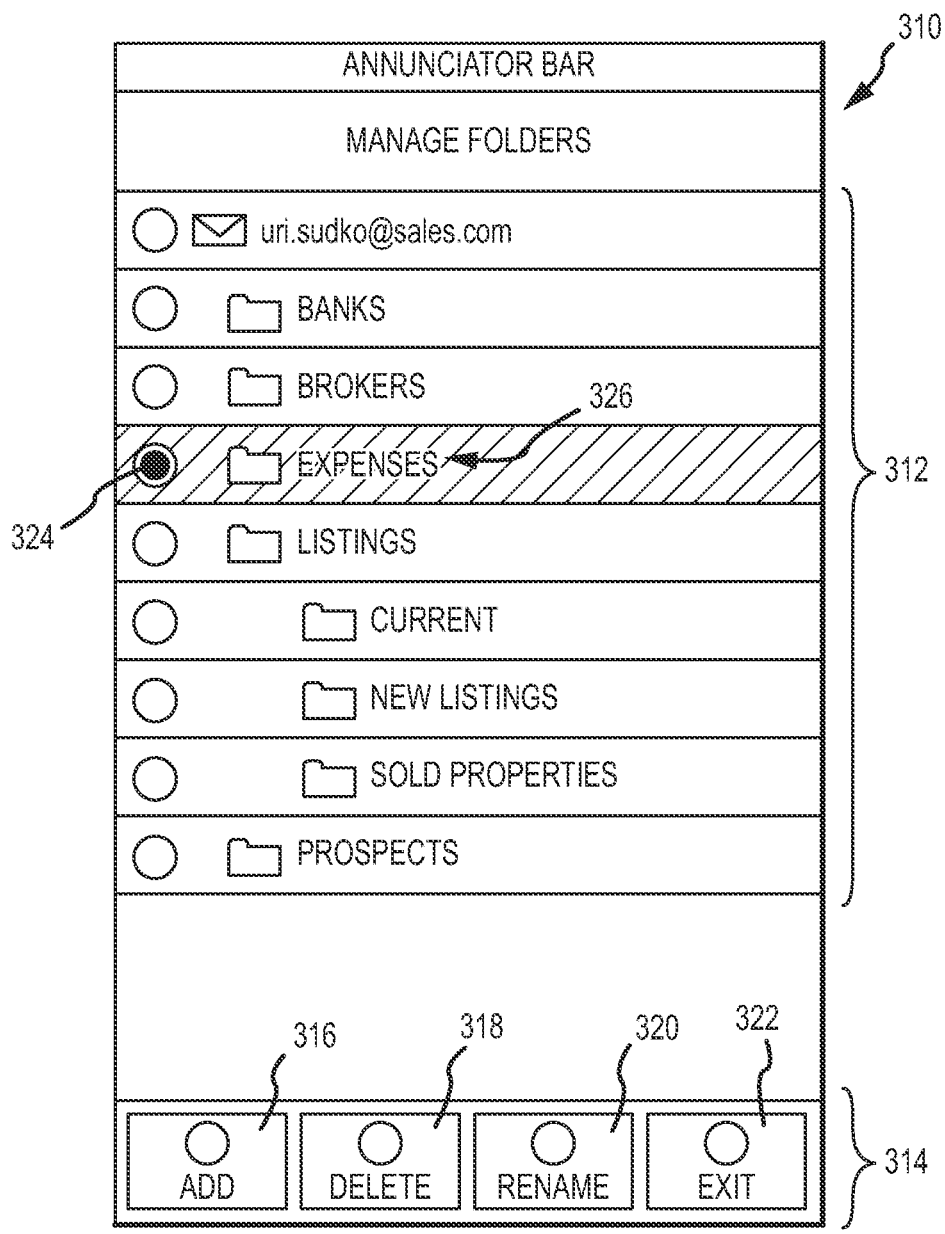
FIG. 8 is a screen shot of an embodiment of a folder management screen.

An email account may include a plurality of folders and subfolders into which email messages may be stored. Accordingly, the email client may be able to perform operations with respect to the folders and subfolders associated with an email account. For example, a folder management screen 310 is depicted in FIG. 8 that presents to a user a folder list 312 associated with an email account including a number folders and subfolders for navigation by a user. The folder management screen 310 may also include a plurality of action buttons 314. In this regard, the email client may be operative to modify the folders and subfolders associated with the email account. For instance, folders or subfolders may be added, deleted, or edited using the email client.

As depicted in FIG. 8, the action buttons 314 include an add button 316 for adding a folder or subfolder, a delete button 318 for deleting a folder or subfolder, and a rename button 320 for renaming a folder or subfolder. As depicted in FIG. 8, the folders or subfolders may be selected in the folder list 312 of the folder management screen 310. Once selected, a selection indicator 324 may be shown adjacent to the selected folder 326. Other indications of a selected folder may be provided such as, for instance, highlighting a selected folder 326 in the folder listing 312 as shown. In any regard, the selected folder 326 may be the target of the action initiated by way of the action buttons 314.

Figure 9:
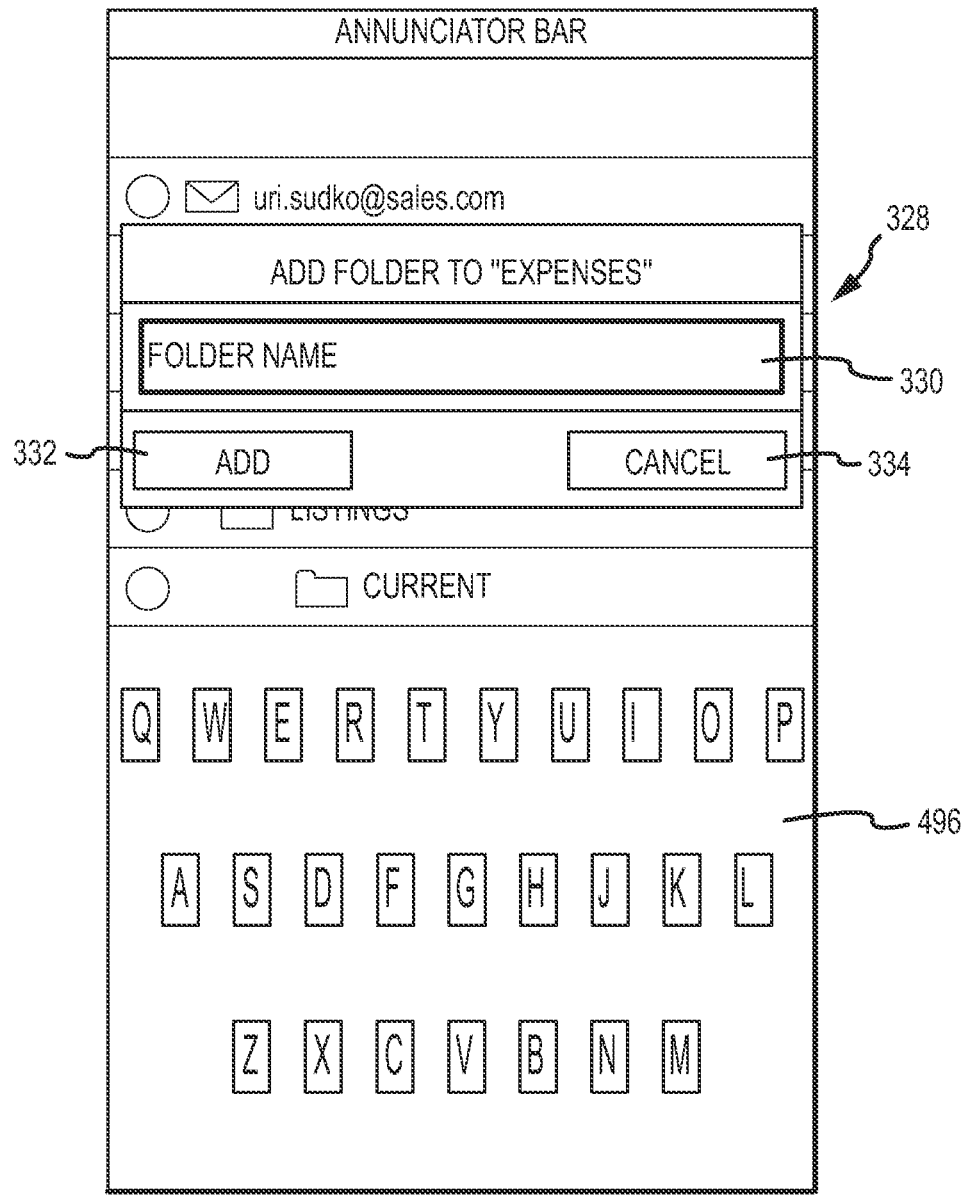
FIGS. 9-11 are screen shots of embodiments of screens for editing a folder listing.

For example, in FIG. 8, the "EXPENSES" folder has been selected. Upon selection of the add button 316, an add folder screen 328 may be depicted as shown in FIG. 9. Because the "EXPENSES" folder was selected, a subfolder may be added to the "EXPENSES" folder as can be appreciated in the add folder screen 328. An input field 330 is presented into which a user may enter a folder name for the new folder or subfolder (e.g., using the keyboard 496 displayed on the add folder screen 328). Upon selection of the add button 332, the folder may be created having a name as entered in the input field 330. A user may cancel the addition of a new folder by selection of the cancel button 334.

Figure 10:
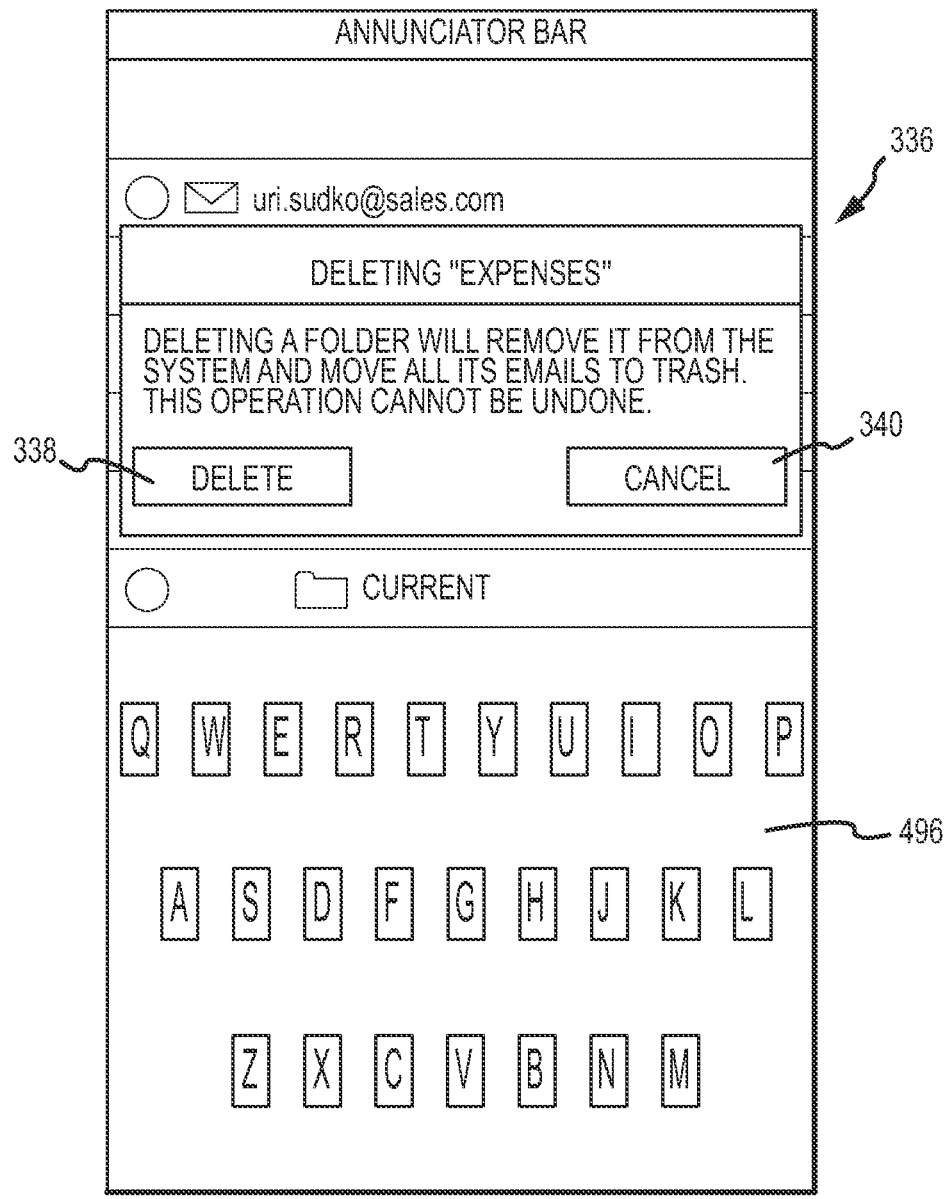

With additional reference to FIG. 10, a folder deletion screen 336 is shown that may be displayed upon selection of the delete button 318 shown in FIG. 8. Upon selection of the delete button 318 shown in FIG. 8, the folder deletion screen 336 may be presented to confirm the deletion of the selected folder 326 and all of its contents. If a user desires to complete the deletion of the selected folder 326, the confirm delete button 338 may be selected, or alternatively, the cancel button 340 may be selected to cancel the delete operation.

Figure 11:
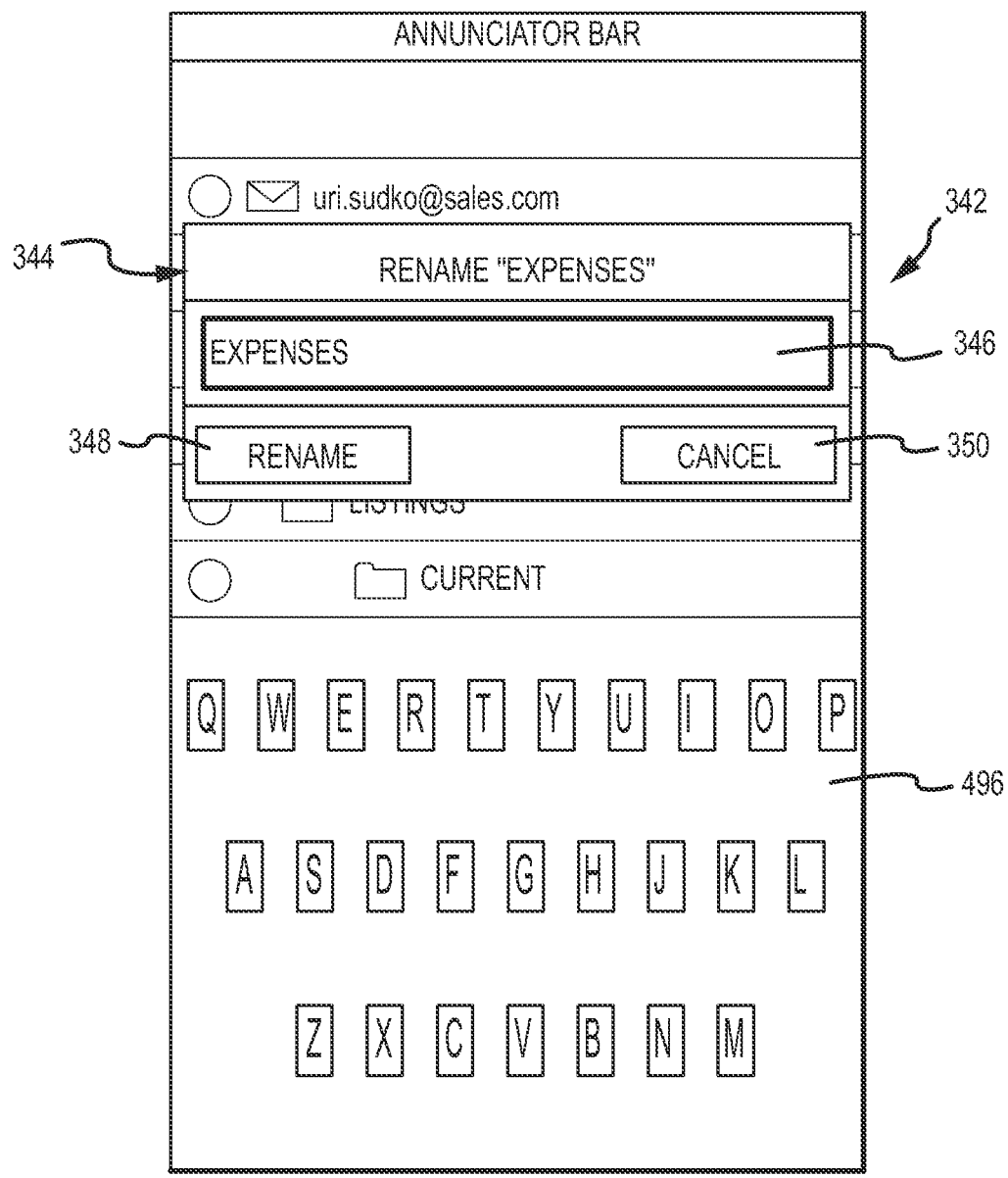

With additional reference to FIG. 11, a folder renaming screen 342 is depicted. In this regard, when the rename button 320 is selected as shown in FIG. 8, the rename folder screen 342 may be presented to allow a user to rename the selected folder 326. The rename folder screen 342 may include an indication 344 of the folder to be renamed (i.e., the selected folder 326), an input field 346 for accepting a user input of a new folder name (e.g., from the keyboard 496 displayed on the rename folder screen 342), a rename button 348 for confirming the input folder name, and a cancel button 350 for cancelling the rename operation. In this regard, the folders associated with an email account may be edited directly on the device executing the email client.

Figure 12:
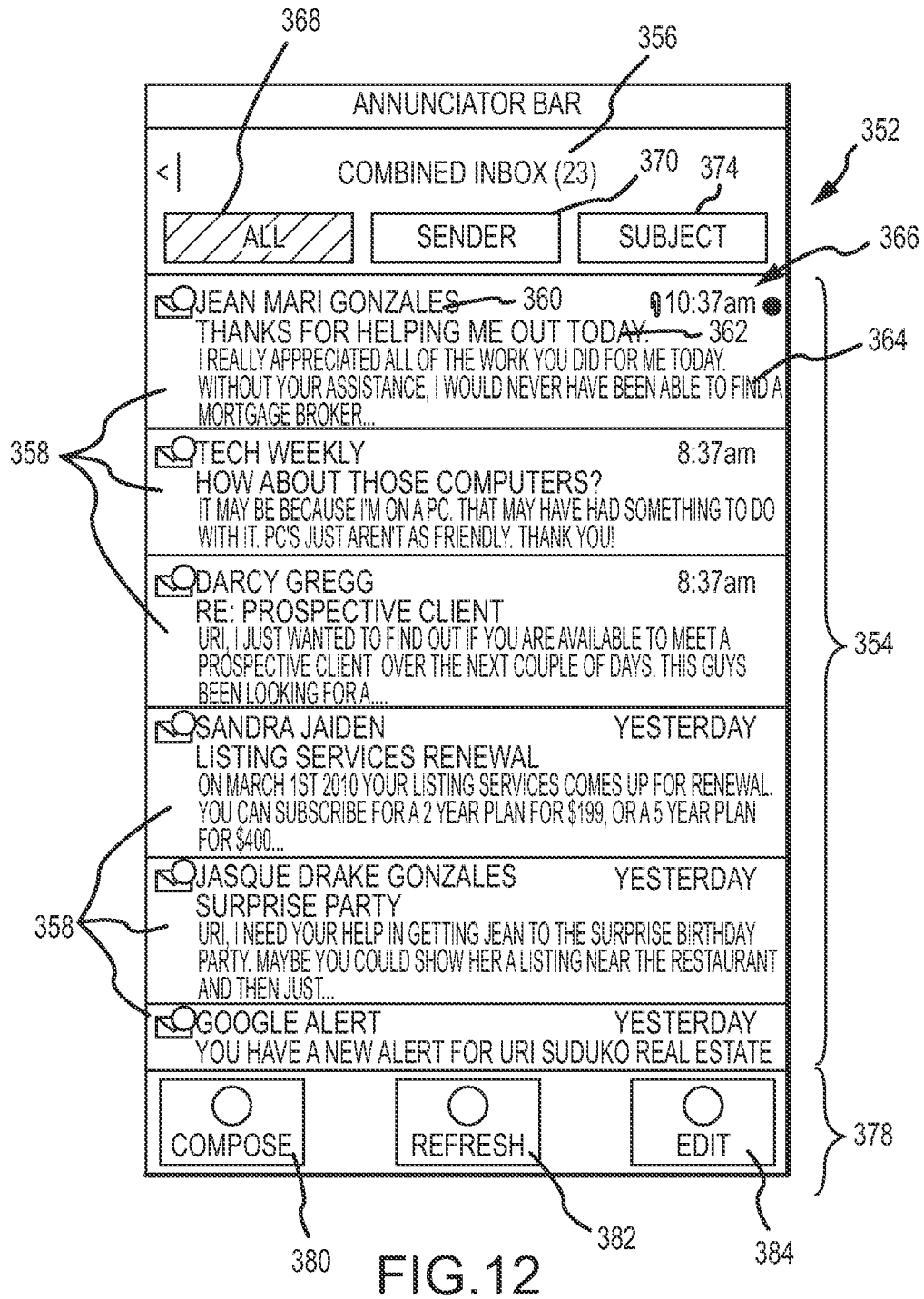
FIG. 12 is a screen shot of an embodiment of a message listing screen.

With additional reference to FIG. 12, a message listing screen 352 is depicted. The message listing screen 352 may present to a user a message list 354 of the messages contained within one or more folders 312 of an email account. As referenced above, the email client may be operable to receive email messages for a plurality of different email accounts. Accordingly, as shown in FIG. 12, a combined inbox message listing may be depicted. The combined inbox message listing may include the contents of a plurality of inboxes from more than one email accounts for which the email client is configured. In this regard, a folder identification field 356 may be shown near the top of the message listing screen 352. The folder identification field 356 in FIG. 12 depicts that the combined inbox contents are being shown in the message list 354 depicted in FIG. 12. It will be understood that any particular folder or subfolder may be selected such that the contents of the selected folder are displayed in the list 354 and the name of the selected folder may be listed in the folder identification field 356.

As can also be appreciated in FIG. 12, the messages 358 contained within a selected folder may be displayed in the message list 354. The message list 354 may include information for each message 358 such as, for example, the sender of the message 360, the subject line 362 of the message, and a preview 364 of the message body. Furthermore, a status field 366 may be provided to indicate whether the message is new, contains an attachment, and/or display a time the message 358 was received.

Figure 13:
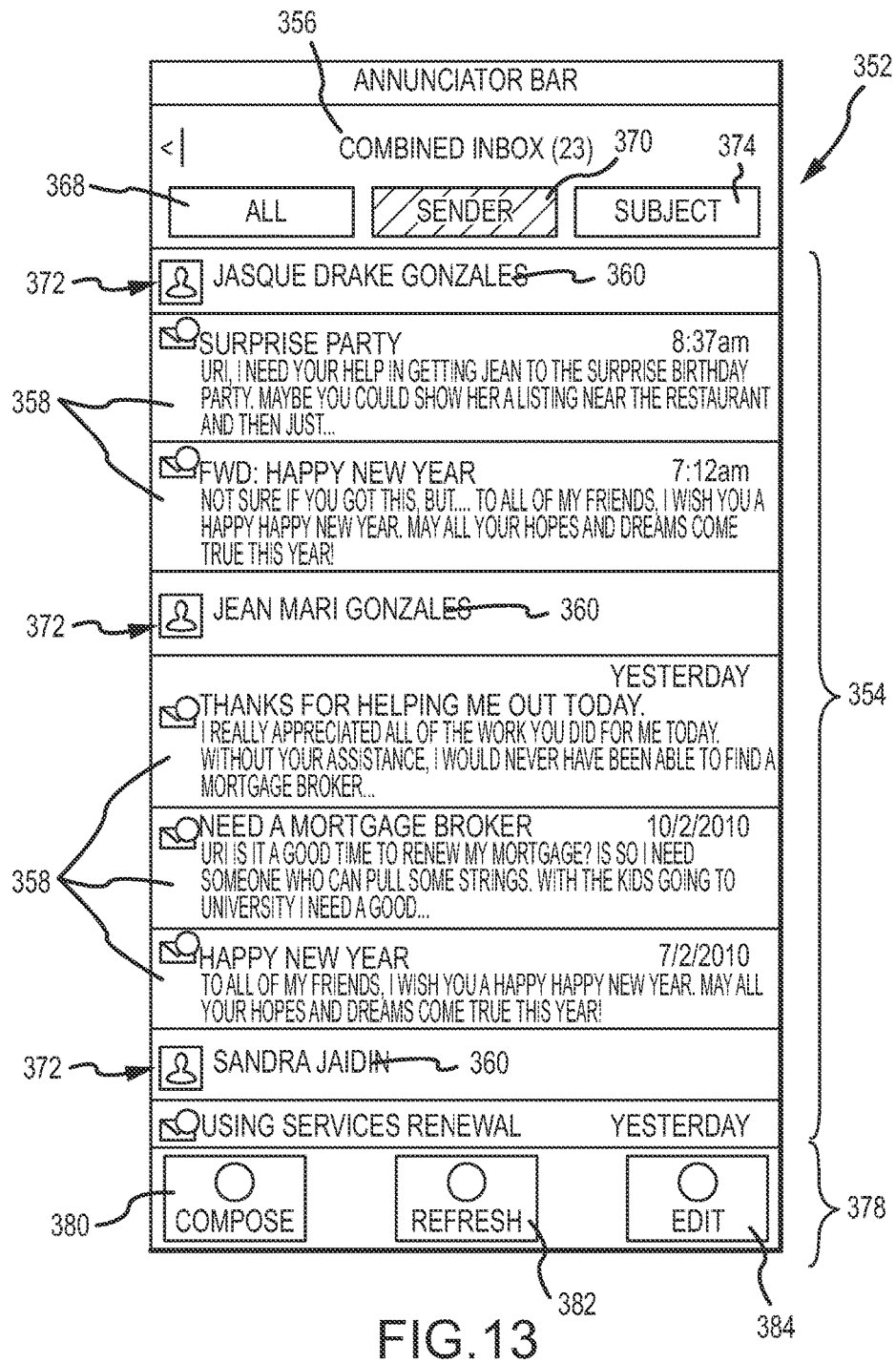
FIGS. 13 and 14 are screen shots of embodiments for sorting a message listing on the message listing screen shown in FIG. 11.
Figure 14:
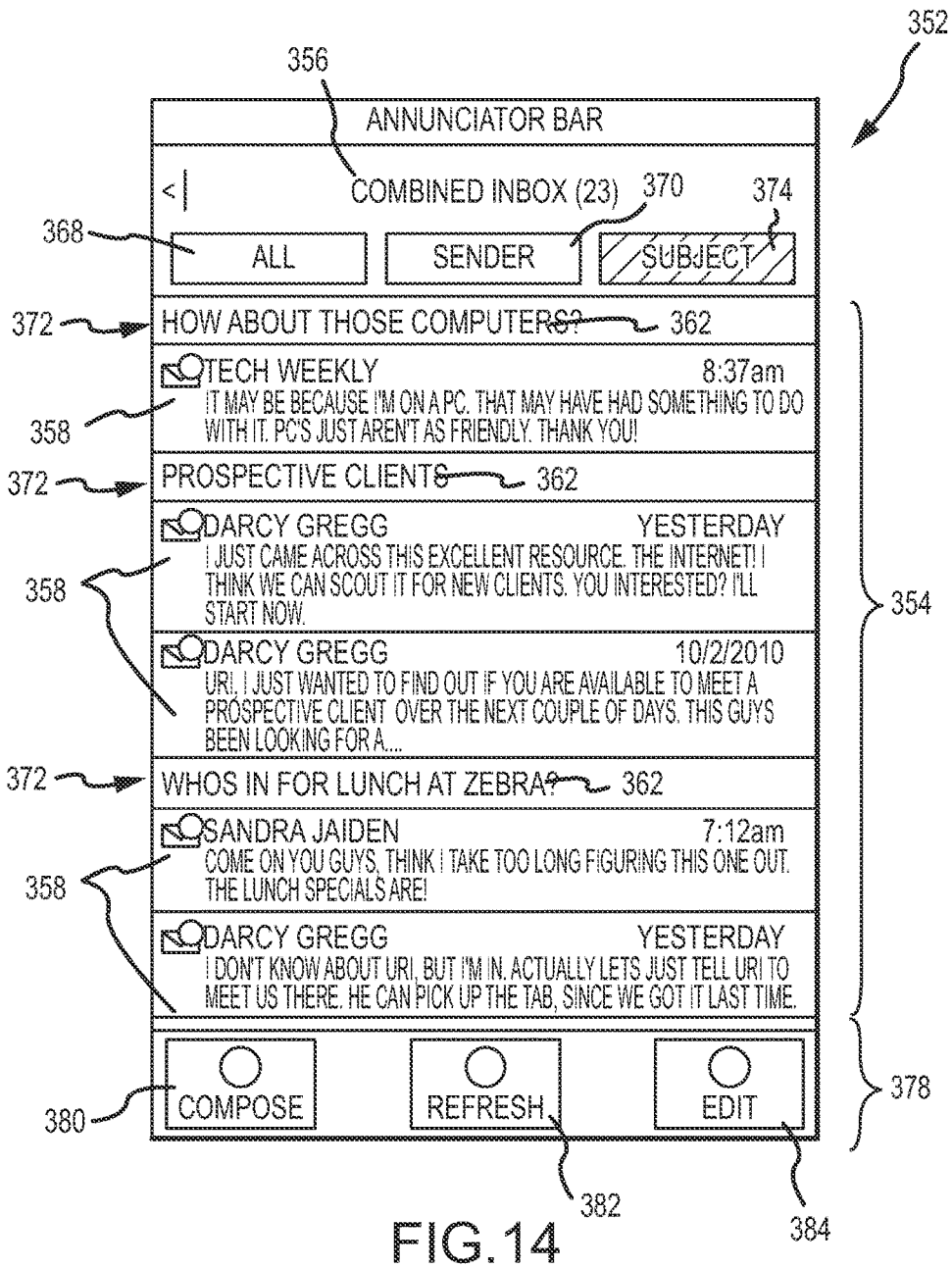

Furthermore, the messages 358 may be sorted in a plurality of ways in the message list 354. For example, as shown in FIG. 12, the "ALL" sort button 368 is selected. Accordingly, all messages may be sorted by time of arrival. With further reference to FIG. 13, the "SENDER" sort button 370 may be selected such that the messages 358 are sorted by the sender 360 of the message. In this regard, it will be appreciated that the messages 358 in the message list 354 are listed with respect to the particular sender 360 of each message 358. In this regard, category headings 372 may be provided such that the category heading 372 displays a name of the sender 360 and messages 358 received from the sender 360 corresponding to the category heading 372 are listed below the category heading 372. With further reference to FIG. 14, the "SUBJECT" sort button 374 may be selected such that the messages 358 are sorted by the content of the subject lines 362 of the messages 358. In this regard, messages 358 having common subject lines 362 are displayed categorically with the respective subject line 362 being displayed in a category heading 372.

Figure 15:
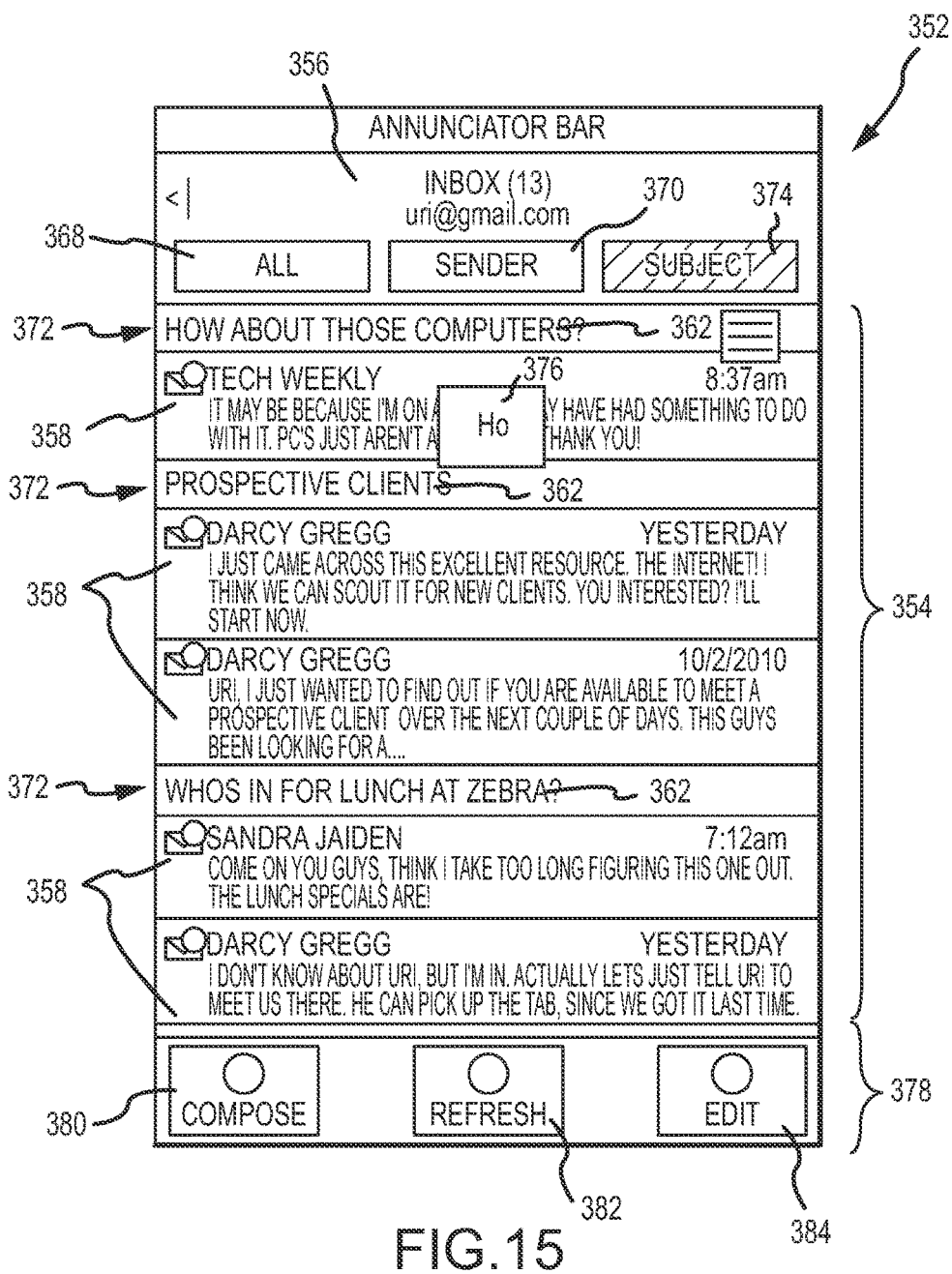
FIG. 15 is a screen shot of an embodiment of a message listing screen showing a position indicator.

Regardless of the manner in which the messages are categorized, the list 354 of messages may be scrolled through to display different portions of the message list 354. For example, with respect to FIG. 15, the messages are shown sorted by subject line 362. Upon scrolling through the list 354 of the messages 358, the category headings 372 containing the various subject matter lines 362 may be used by a user to determine what portion of the list 354 is displayed. To assist in this regard, a position indicator 376 may be displayed to indicate the current position of the display of the list 354 of email messages 358. For example, as shown in FIG. 15 a position indicator 376 including the text "HO" is depicted corresponding to the subject line 362 "How about those computers?" In this regard, when navigating through the message list 354, and especially when navigating quickly, the position indicator 376 may be used by a user to determine what portion of the message list 354 is currently displayed.

Figure 28:
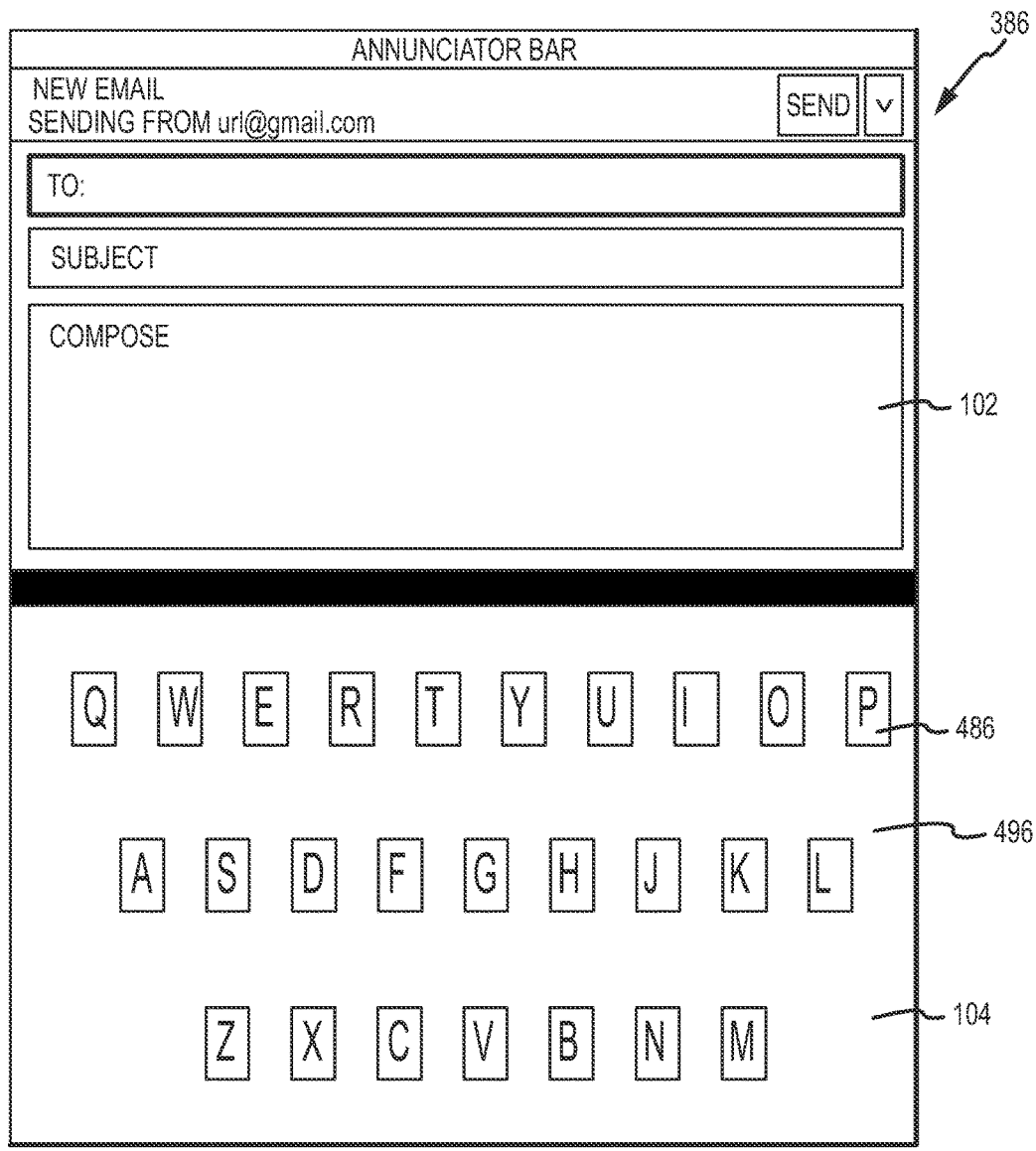
FIG. 28 is a screen shot of an embodiment of an email composition screen executing in dual screen mode.

As depicted in FIGS. 12-15, the message listing screen 354 may include a number of action buttons 378. For example, a compose button 380, a refresh button 382, and an edit button 384 may be presented in the message listing screen 352. Upon selection of the compose button 380, an email composition screen 386 (an example of which is shown in FIG. 28) may appear that allows the user to compose an email message to be sent. The refresh button 382 may be used to refresh the message list 354 such that, for example, any email messages 358 residing on the email server are retrieved and any messages 358 in an outbox of the email client are sent. Additionally, an edit button 384 may be presented that allows the user to edit the messages in the message listing screen.

Figure 16:
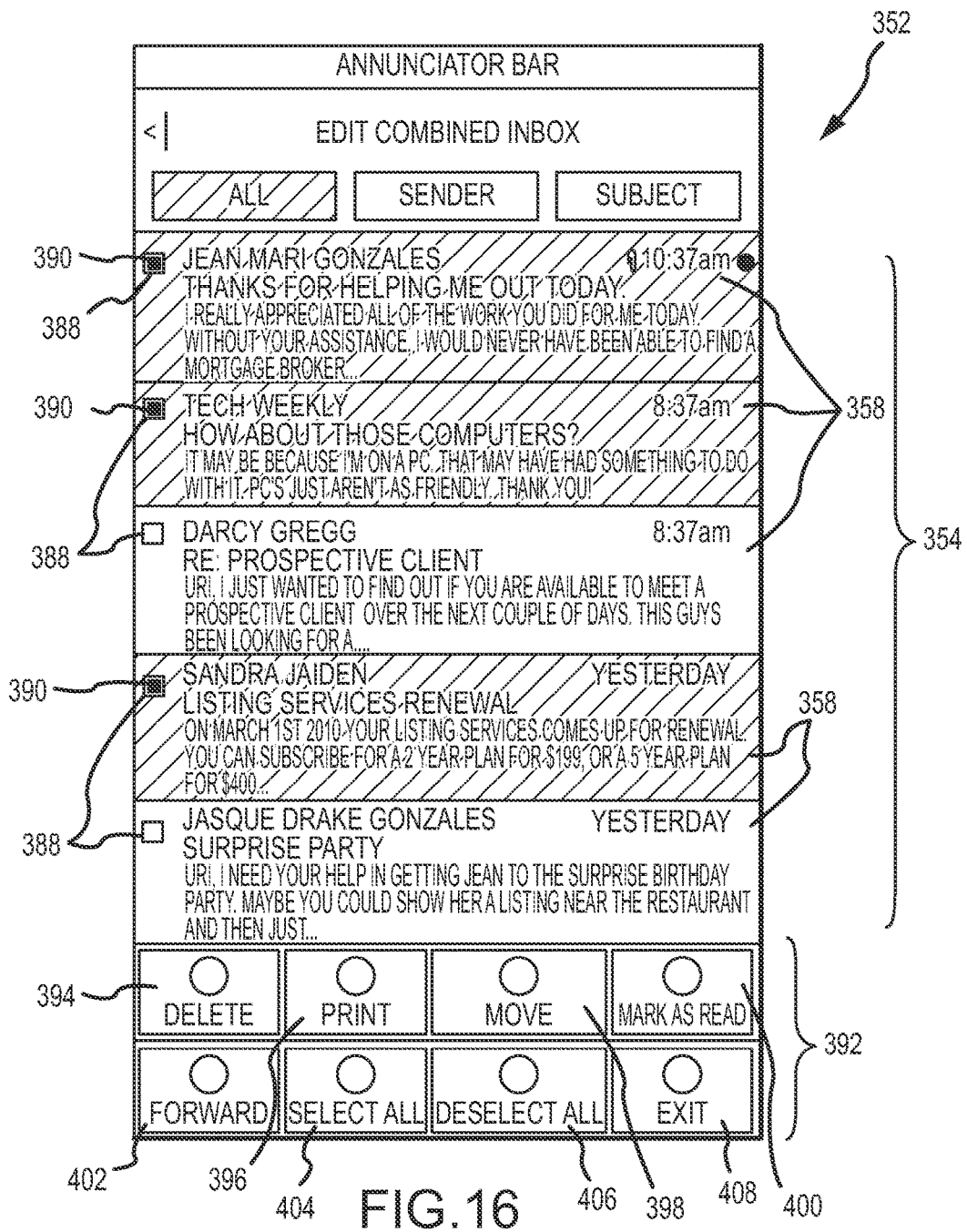
FIG. 16 is a screen shot of an embodiment of a message listing screen for editing the messages in the message listing.

For example, with respect to FIG. 16, the edit button has been selected and, in response, each message 358 in the message listing 354 is modified to include a selection box 388. The selection box 388 may be used to select one or more messages 358 within the message list 354. Upon selection of the selected messages (e.g., denoted by a selection indicator 390 in the selection box 388), subsequent selection of one of the action buttons 392 that appear upon selection of the edit button 384 may result in an action corresponding to one of the action buttons 392 being taken with respect to all of the selected messages 358.

For example, shown in FIG. 16, three of the messages 358 in the message list 354 have been selected. A number of action buttons 392 are presented including a delete button 394, a print button 396, a move button 398, a mark as read button 400, a forward button 402, a select all button 404, and a deselect all button 406. Upon selection of one of these action buttons 392, the corresponding action may be performed on all the selected messages. For example, the selected messages 358 may be deleted, printed, moved, marked as read, forwarded, etc. By moved, it is meant that the messages 358 may be moved to another folder or subfolder within the email client. When marked as read, an email message 358 may be shown as being read without the message 358 having to be opened. Furthermore, a message 358 may be forwarded by selecting the forward button. Upon selection of the forward button, an email composition screen 386 (an example of which is shown in FIG. 28) may be displayed that includes the message to be forwarded such that the user may enter recipients of the forwarded message(s). The select all button 404 and deselect all button 406 may be used to select all of the message 358 in the message list 354 or deselect all the messages 358 in the message listing 354. An exit button 408 may be used to exit the edit mode of the message listing screen 352 as shown in FIG. 16 and return the message listing screen to the standard mode shown in FIGS. 12-15.

Figure 17:
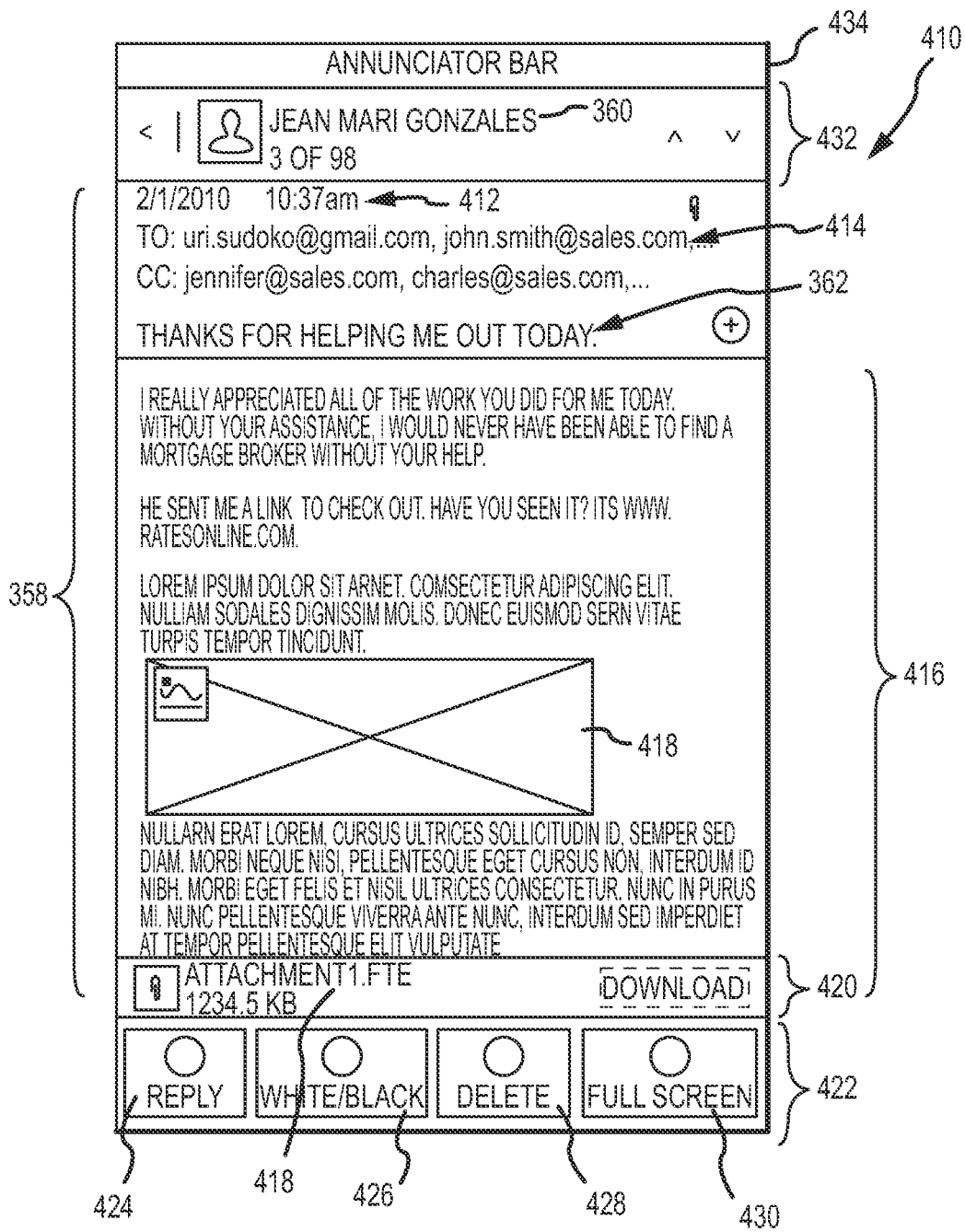
FIG. 17 is a screen shot of an embodiment of a message detail screen.

With further reference to FIG. 17, a message detail screen 410 is depicted. The message detail screen 410 may be shown, for example, in response to selection of one of the messages 358 from the message listing screen 352. The detail message screen 410 may include information regarding the sender 360 of the message 358, a time 412 corresponding to when the message 358 was received, a listing 414 of to whom the message 358 was sent, a subject line 362 of the message 358, and the message body 416. The message body 416 may be, for example, in html format, in plain text format, or in rich text format and may include attached files 418 (e.g., document files, image files, video files, etc.). The attached file 418 may be displayed in line with the text of the message body 416 or may be shown in an attachment bar 420. The attachment bar 420 may be employed by a user to control the download, saving, and/or opening of the attached file 418 displayed in the attachment bar 420 as will be discussed in greater detail below with respect to FIG. 19.

Furthermore, the message detail screen 410 may include a number of message detail action buttons 422. For example, selecting a reply button 424 may result in a reply message being presented in an email composition screen 386 (an example of which is shown in FIG. 28) that allows the user to enter a reply message to be sent to the sender of the message 358 displayed in the message detail screen 410. Additionally, a white/black button 426 may allow the display of the message 358 to be modified such that the colors of the text and the background of the message are inverted. That is, instead of a white background with black text as depicted in FIG. 17, a black background with white text may be depicted. The white/black button 426 may be used to toggle between the use of a black background and white background to display the message 358. The use of the white/black button 426 may be particularly advantageous to extend the battery life of the device executing the email client because for many displays (e.g., LCD displays) displaying the color black requires less energy than a displaying the color white. As the background of a message 358 may occupy more space on the display than the text of the message 358, the use of a black background may require less power from a battery, thus extending the life of the battery.

Furthermore, a delete button 428 is provided that, when selected, deletes the message 358 displayed.

Figure 18:
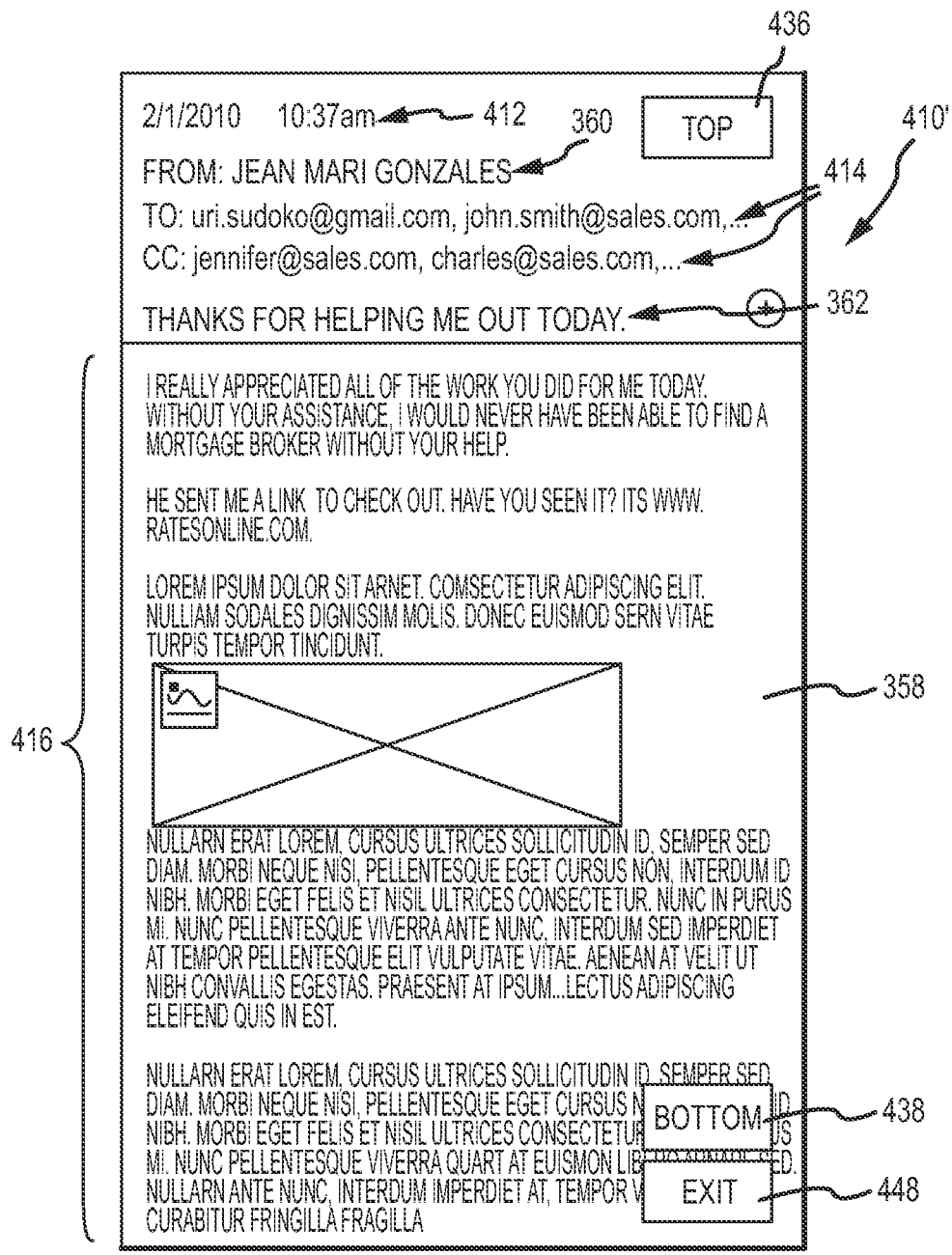
FIG. 18 is a screen shot of an embodiment of a message detail screen executing in full screen mode.

Also, in the action buttons 422 of the message detail screen 410, a full screen button 430 may be presented that may allow the message 358 to be read in full screen mode 410' as shown in FIG. 18. That is, upon selection of the full screen button 430, the message 358 may be displayed in full screen mode 410'. The full screen mode 410' may include the information depicted in the message detail screen (e.g., the sender 360 of the message 358, an indication 412 of when the message 358 was received, a listing 414 of to whom the message 358 was sent, a subject line 362 of the message 358, and the message body 416) but may remove at least some of the elements of the message detail screen 410 such as a title bar 432, an annunciator bar 434, and/or action buttons 422 displayed in the normal mode of the message detail screen 410 (e.g., as depicted in FIG. 17). In the full screen mode 410' of the message detail screen 410, a number of phantom buttons (e.g., top button 436, bottom button 438, and exit button 440) may be provided. The phantom buttons may appear only when a user enters an input adjacent where the buttons are located (e.g., the user taps or hovers near one of the buttons). That is, the phantom buttons 436, 438, and 440 may have an "auto hide" feature, such that when not in use the phantom buttons are not displayed. Selection of the top button 436 may result in navigation to the top of the message 358, selection of the bottom button 438 may result in the navigation to the bottom of the message 358, and the exit button 440 may result in the exiting of the full screen mode 410' of the message detail screen 410 (e.g., returning to the message detail screen 410 in normal mode as depicted in FIG. 17).

Figure 19:
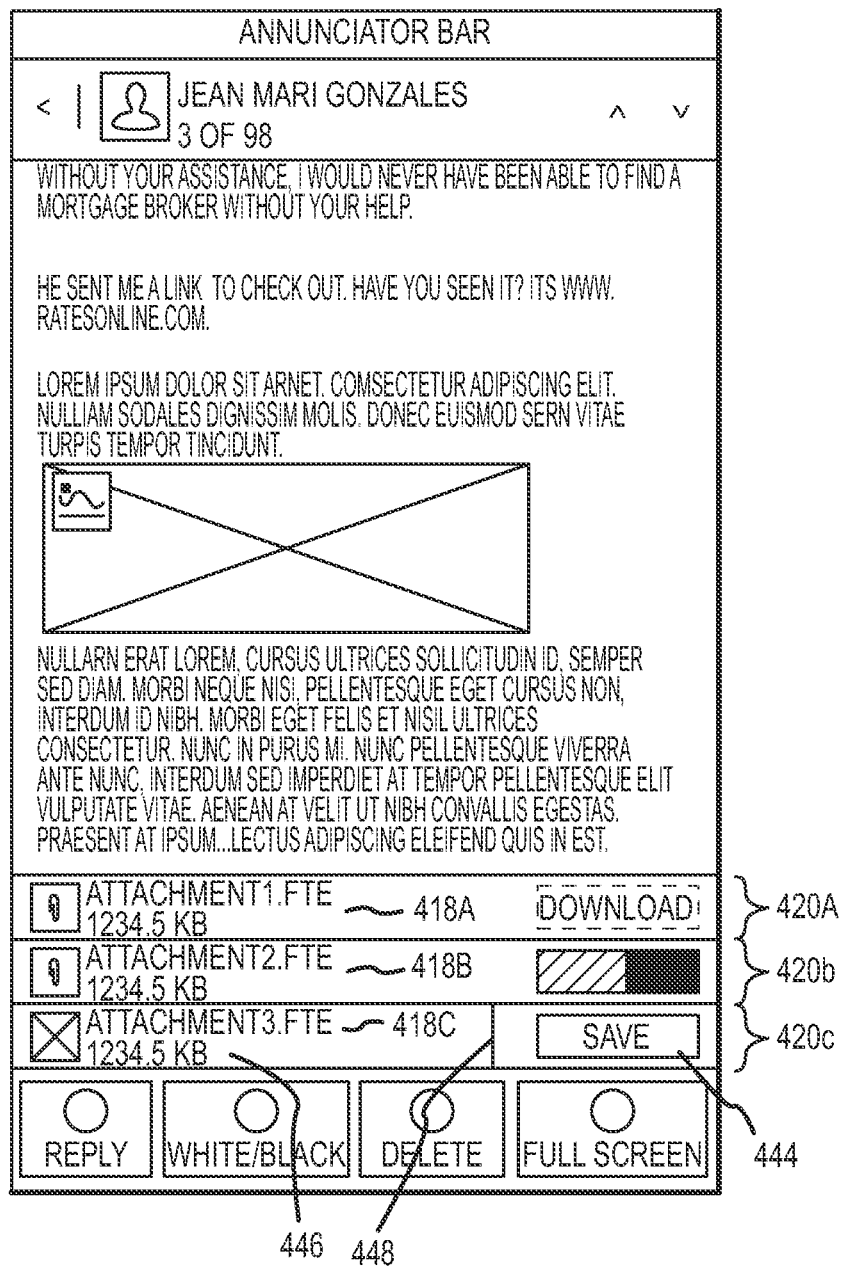
FIG. 19 is a screen shot of an embodiment of a message detail screen for a message including attachments.

With further reference to FIG. 19, the behavior of attachment bars 420 in various instances of operation of the email client is depicted. A first attachment bar 420A corresponds to first attached file 418A named "attachment 1.fte". Upon selection of the first attachment bar 420A, the first attached file 418A may begin to download. Upon selection of the first attachment bar 420A, in addition to initiating the download of the first attached file 418A, the first attachment bar 420A may undergo some action to indicate the input has been received. For example, the attachment bar 420A may be depicted as rotating, changing color, or otherwise becoming animated. Additionally, for example, upon selection of an attachment bar 420, the attachment bar 420 may be displayed as shown in a second attachment bar 420B corresponding to the second attached file 418B named "attachment 2.fte". In the second attachment bar 420B, a status bar 442 may be provided to indicate the status of the download of the second attached file 418B. Once the download of the second attached file 418B has been completed, the attachment bar 420B may be modified to appear as shown with respect to a third attachment bar 420C corresponding to a third attached file 418C named "attachment 3.fte". That is, the third attachment bar 420C depicts the status of an attachment bar 420 once a file 418 associated therewith has been downloaded. Selection of the save button 444 of the third attachment bar 420C may result in saving the third attached file 418C to the device upon which the email client is executing. In contrast, selection of the name 446 of the attached file 418C (e.g., or any space to the opposite side of a divider 448 provided on the third attachment bar 420C) may result in opening the third attached file 418C without saving the third attached file 418C to non-volatile memory of the device upon which the email client is executing.

It may be that, in one embodiment, the file attached to the email may be in a non-executable file format. That is, the handheld device may not include a program capable of opening or executing the file that is attached. However, the email client may still be operable to save the file into non-volatile memory of the device, regardless of whether the file can be opened or executed by any program stored on the device. Furthermore, the device may be operable to communicate the file in non-executable file format to another device (e.g., as an attachment to an outgoing email, via the I/O module 130, wirelessly, or by some other means). In this regard, the handheld device may act as a courier or data repository of the file in non-executable form so that the file may be transported using the handheld device even though there is no program resident on the handheld device that is capable of opening or executing the file.

Figure 20:
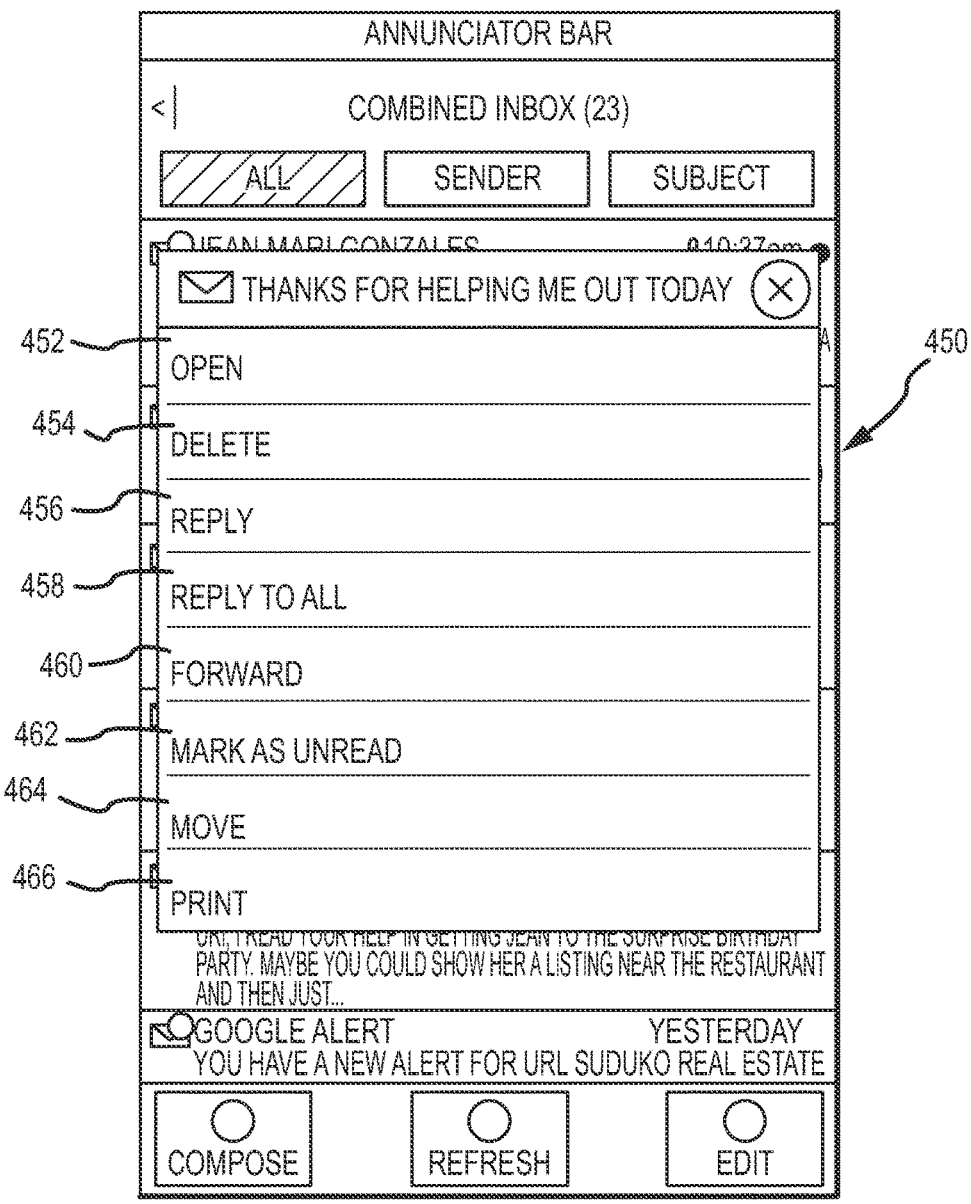
FIG. 20 is a screen shot of an embodiment of a menu relating to a message displayable in response to a gesture input.

As described above, it may be advantageous to provide gesture inputs for manipulation of applications, particularly in a context of a handheld device with limited screen space. In this regard, the email client described herein may also be operative to respond to gesture inputs from a user to facilitate functionality of the email client. For example, as shown in FIG. 20, a contextual menu 450 associated with a particular message 358 may be display upon receipt of a gesture input. The gesture input may be directed at a target message. In this regard, a message 358 displayed in the message listing screen 352 of FIGS. 12-16 or in the message detail screen 410 of FIGS. 17-19 may be the target of a gesture input by a user. For example, a contextual menu 450 regarding the message 358 may be displayed in response to receipt of the gesture input. In one particular embodiment, the gesture may be a long press 188 (as shown in FIG. 4) directed at the message 358 in either the message detail screen 410 or the message listing screen 352. The contextual menu 450 may provide a plurality of options that may be performed with respect to the selected message 358 such as, for example, operations corresponding to an open button 452, a delete button 454, a reply button 456, a reply to all button 458, a forward button 460, a mark as unread button 462, a move button 464, or a print button 466 provided in the contextual menu 450.

Figure 21:
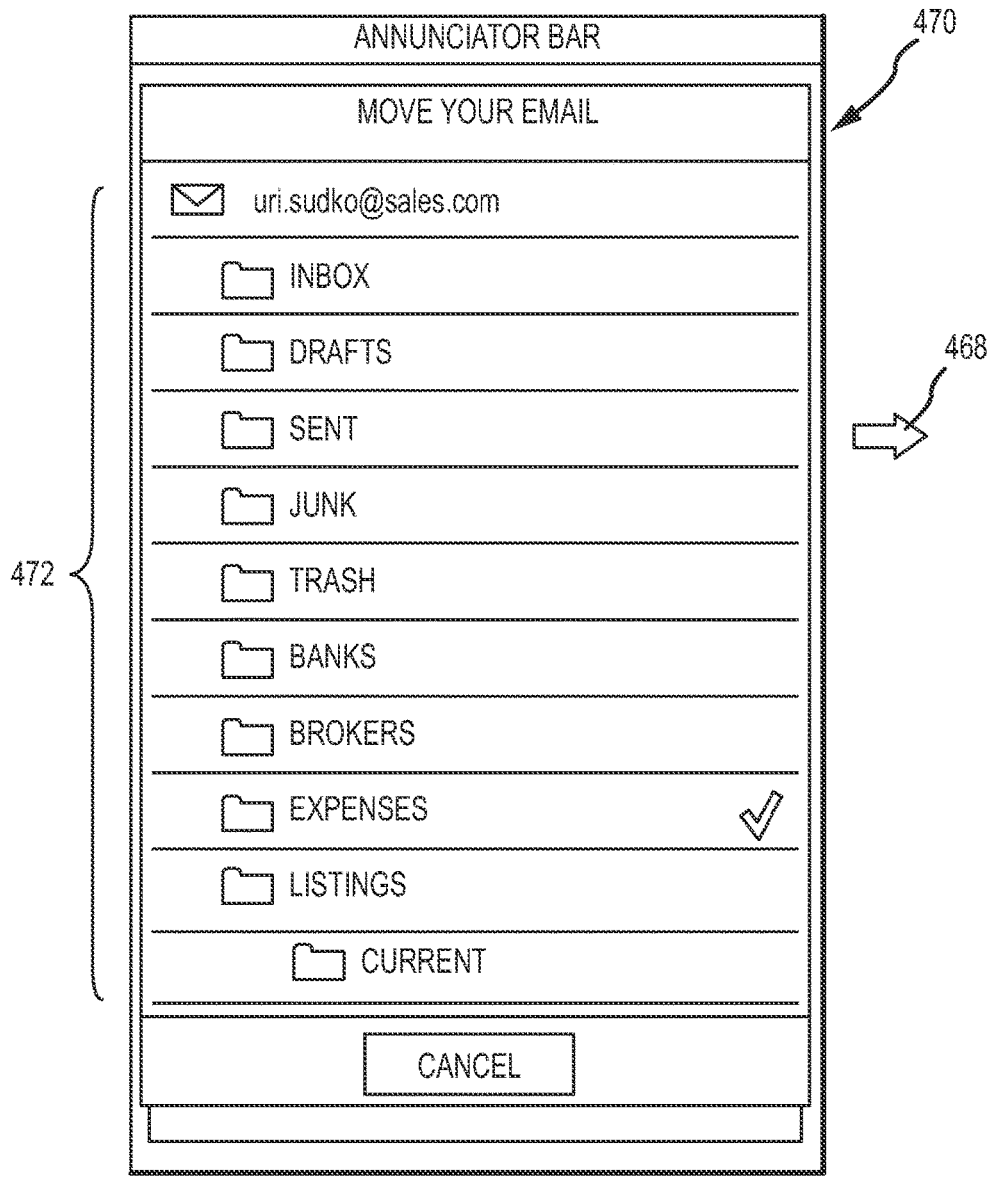
FIGS. 21 and 22 are screen shots including a representation of the response of an embodiment of an email client to a gesture input received for controlling the operation of an e-mail client.
Figure 22:
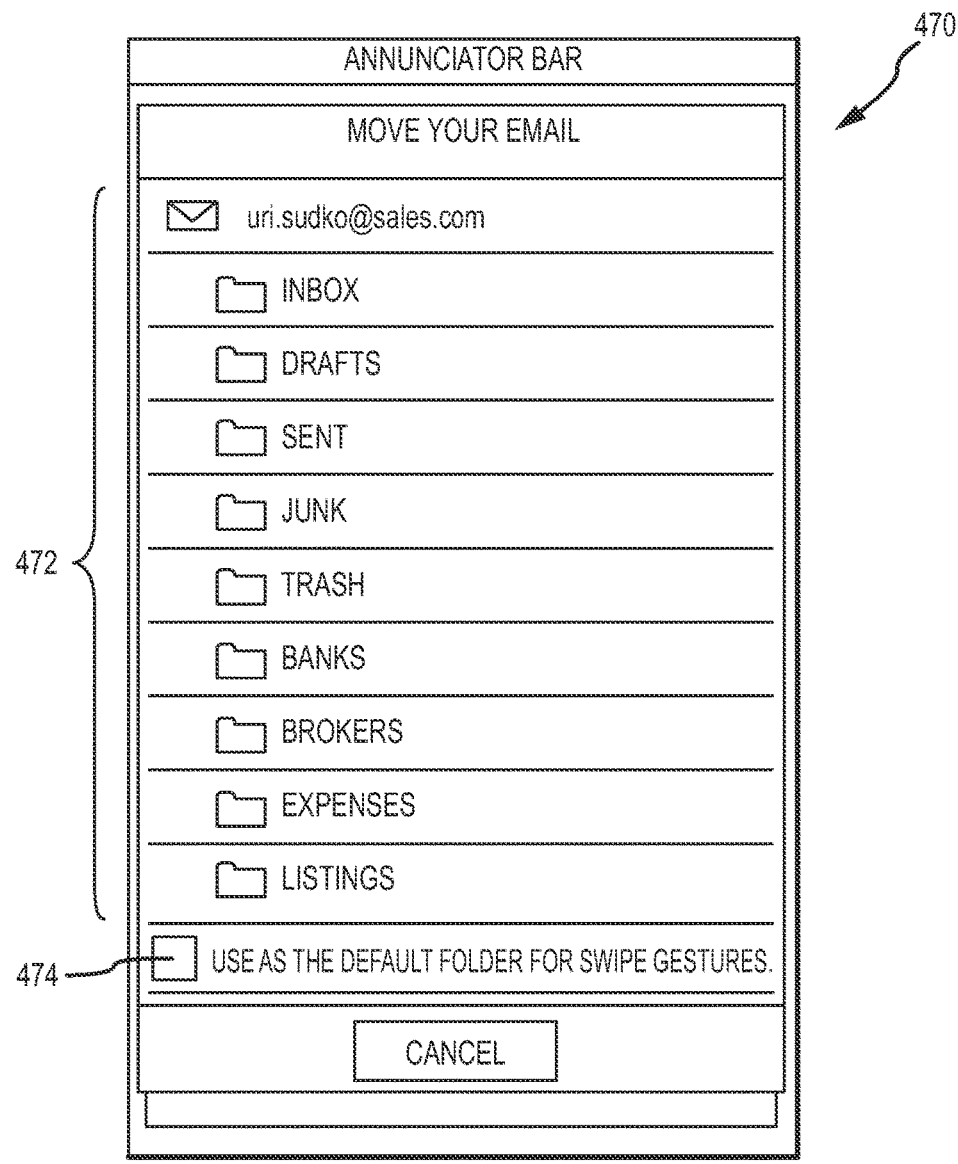

Furthermore, a gesture input may, for example, be associated with any one or more of the particular actions corresponding to the buttons contained within the contextual menu 450 shown in FIG. 20. As shown in FIG. 21, a swipe gesture 468 (e.g., a drag gesture 176 or a flick gesture 178 described with respect to FIG. 4) may be received with respect to a message 358. The swipe gesture 468 may be associated with a move command, wherein a message 358 that is a target of the swipe gesture 468 may be moved into one of a destination folder or subfolder of the email account in response to receipt of the swipe gesture 468. Upon receipt of the gesture 468, a move screen 470 (shown in FIG. 21) may be depicted wherein a user may select a folder (e.g., a destination folder) from a folder listing 472 into which the message 358 is to be moved. Furthermore, shown in FIG. 22, a selection box 474 option may be provided on a move screen 470 such that upon selection of the selection box 474, the selected folder may be set as the default folder into which a message 358 is been moved upon receipt of swipe gesture 468. Different gestures (e.g., a drag 176 versus a flick 178, or movement of the gesture to the right versus movement of the gesture to the left, etc.) may result in different actions being taken with respect to the gesture (e.g., movement into different ones of the folders).

As described above, a hand held electronic device may be provided with a plurality of display devices or display device with a plurality of display portions (e.g., as described in relation to FIG. 1 above). In this regard, the email client described herein may be provided such that it is operative to present different screen portions in a plurality of corresponding display portions. For example, a dual screen handheld device 100 as described above may be provided that is operative to display a plurality of screens in corresponding display portions 102 and 104 of the device 100. As such, the email client may present features particularly directed to the use of the plurality of displays 102 and 104 in presenting a plurality of email client screens therein. While the following will describe a handheld device having two displays 102 and 104 for displaying screen portions therein, it will be understood that additional display portions (e.g., subsets of a larger display device) or additional physical displays may be provided such that the email client may execute to display corresponding screens in the provided display portions.

Furthermore, the various screens of the email client that are displayed in different display portions may be related (e.g., by way of a hierarchical application sequence) and/or one of the screens may be operative to control at least a portion of another of the screens. For example, it may be that the folder management screen 310, message listing screen 352, and message detail screen 410 comprise a hierarchal application sequence as described above with respect to FIG. 2C. That is, the message listing screen 352 may be a child of the folder management screen 310, and the message detail screen 410 may be a child of the message listing screen 352, etc. In this regard, navigation of the email client through the various screens may be dependent upon the hierarchical arrangement of the various screens.

Figure 23:
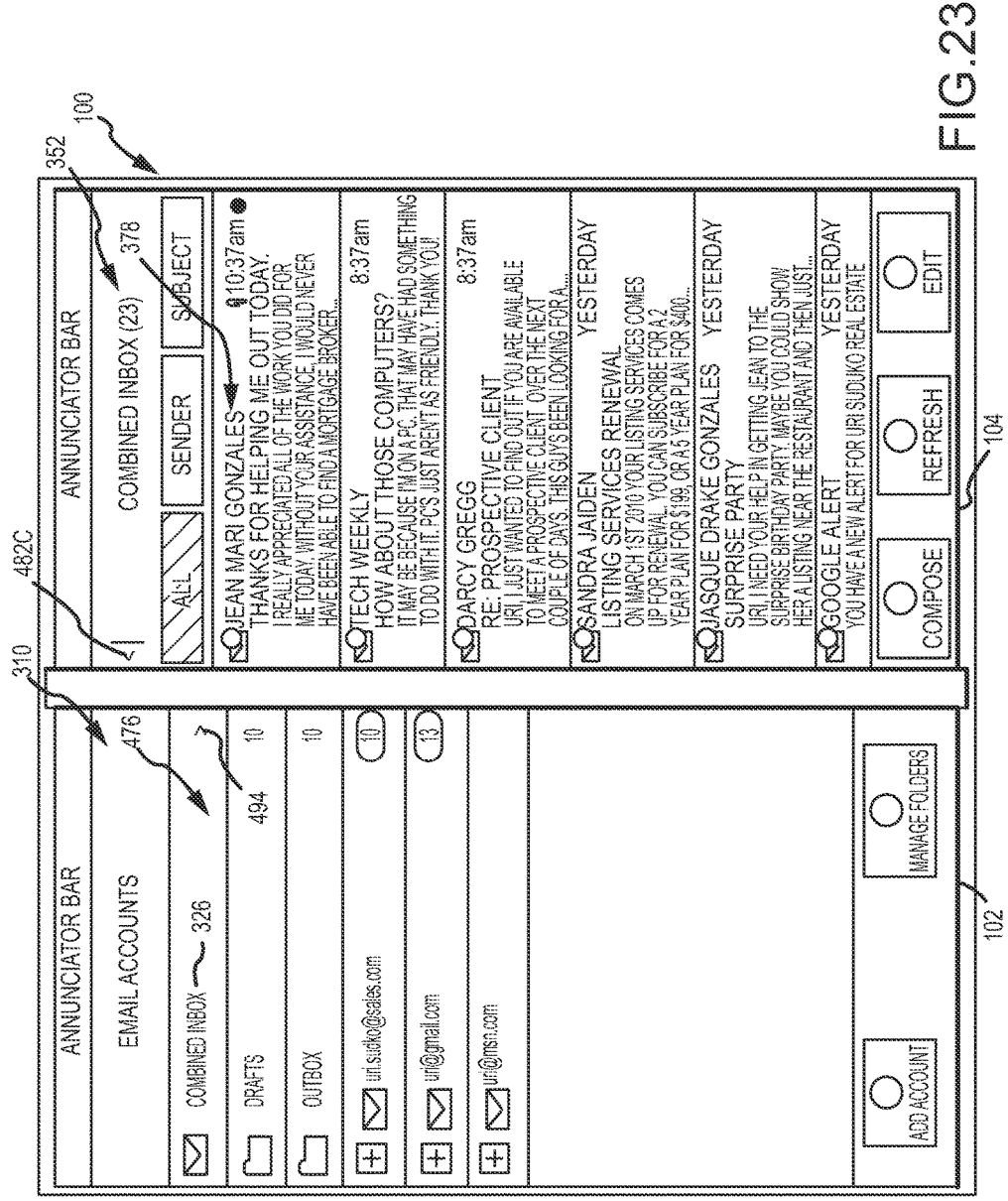
FIGS. 23 and 24 depict an embodiment of a dual screen display executing an email client in dual screen mode on a handheld electronic device.

With particular reference to FIG. 23, the email client is shown executing on a device 100 such that a folder management screen 310 is displayed in a first display 102 and a message listing screen 352 is displayed in a second display 104. The properties and/or characteristics of the respective screens described previously with respect to the folder management screen 310, message listing screen 352, and message detail screen 410 may be equally applicable in the context of the dual screen display of the email client as described herein. It will be appreciated that the action buttons 314, 378, 392, and 422 of the respective screens of the email client discussed above may have similar functionality in the context of a dual screen email client described herein. The email client may be changed between a single screen mode, wherein a single of the screens is displayed in a single display portion of the device and a multi-screen mode, wherein a plurality of screens are displayed in different respective display portions.

The content of the message listing screen 352 may at least be partially dictated by the folder management screen 310. For example, the contents of the selected folder in the folder management screen 310 may be displayed in the message listing screen 352. Accordingly, selection of a different folder or subfolder from the folder management screen 310 may result in the display of the different folder or subfolder's contents in the message listing screen 352. Thus, the message listing screen 352 may be related as a child screen of the folder management screen and be at least partially controlled by way of selection of different folders or subfolders of the folder management screen 310. In this regard, the folder management screen 310 may have a dependency indicator 494 that indicates to a user the relationship between the screens. For instance, as depicted in FIG. 23, the dependency indicator 494 (e.g., an arrow as shown, shading of the selected folder, or other indication presentable to a user) indicates to the user that the contents of the selected folder "COMBINED INBOX" is displayed in the message listing screen 352. Upon selection of a different one of the folders listed in the folder management screen 310, the dependency indicator 494 may correspondingly be changed to indicate the folder or subfolder to which the message listing screen 352 would then correspond.

Figure 24:
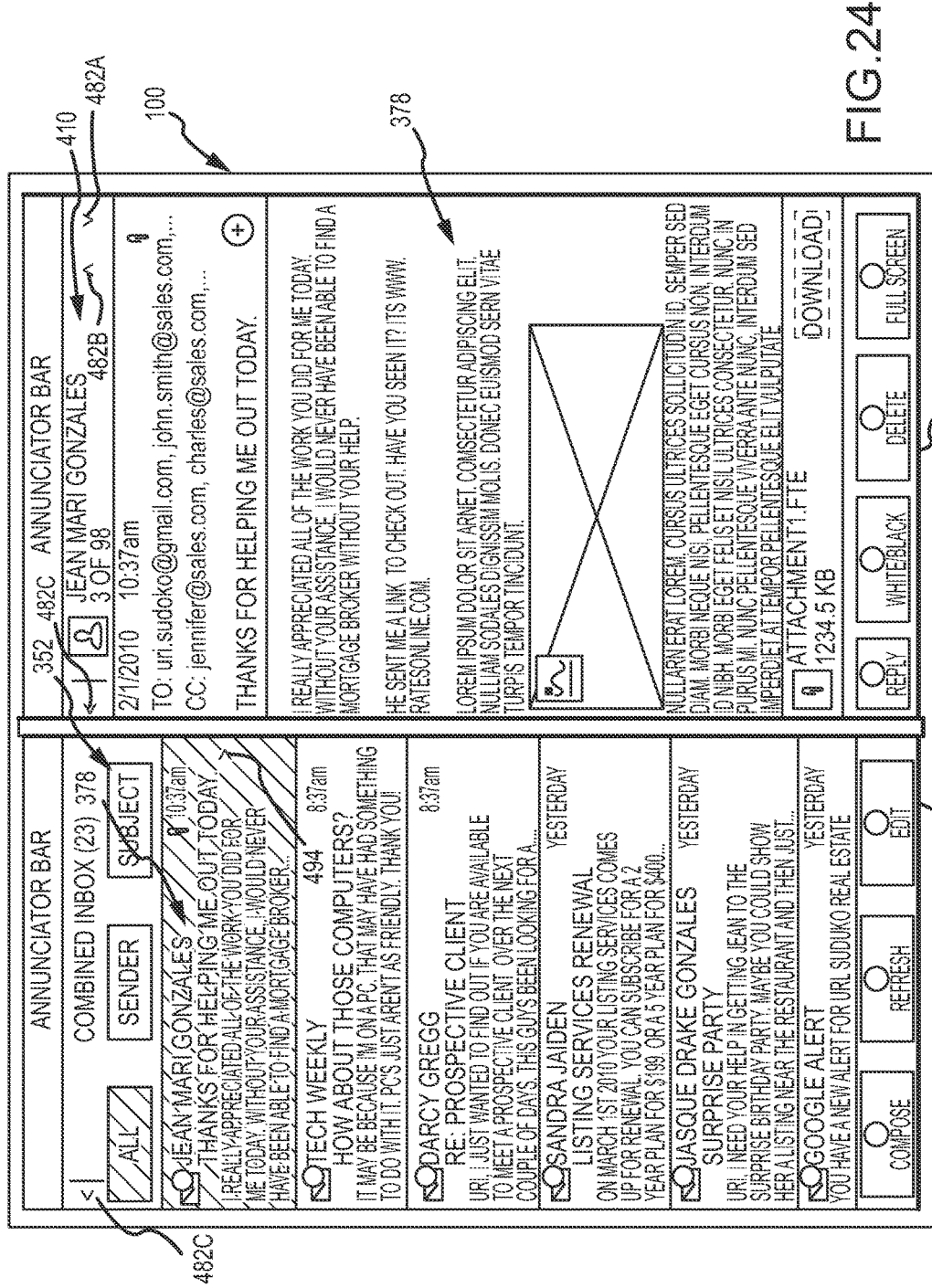

With additional reference to FIG. 24, another instance of the email client is depicted wherein a message listing screen 352 is displayed in a first display 102 and a message detail screen 410 is displayed in second display 104. For example, selection of a particular message 378 in the message listing screen 352 in the second display 104 shown in FIG. 23 may result in a change of the display states of the first display 102 and the second display 104 such that message listing screen 352 is displayed in the first display 102 and a message detail screen 410 corresponding to the selected message 378 is displayed in a second display 104 as shown in FIG. 24. As shown in FIG. 24, a dependency indicator 494 is shown in relation to the selected message 378 to indicate the contents of the message detail screen 410 corresponds to the selected message 378. Upon selection of a different one of the messages in the message listing screen 352, the dependency indicator 494 may be correspondingly changed.

Figure 25:
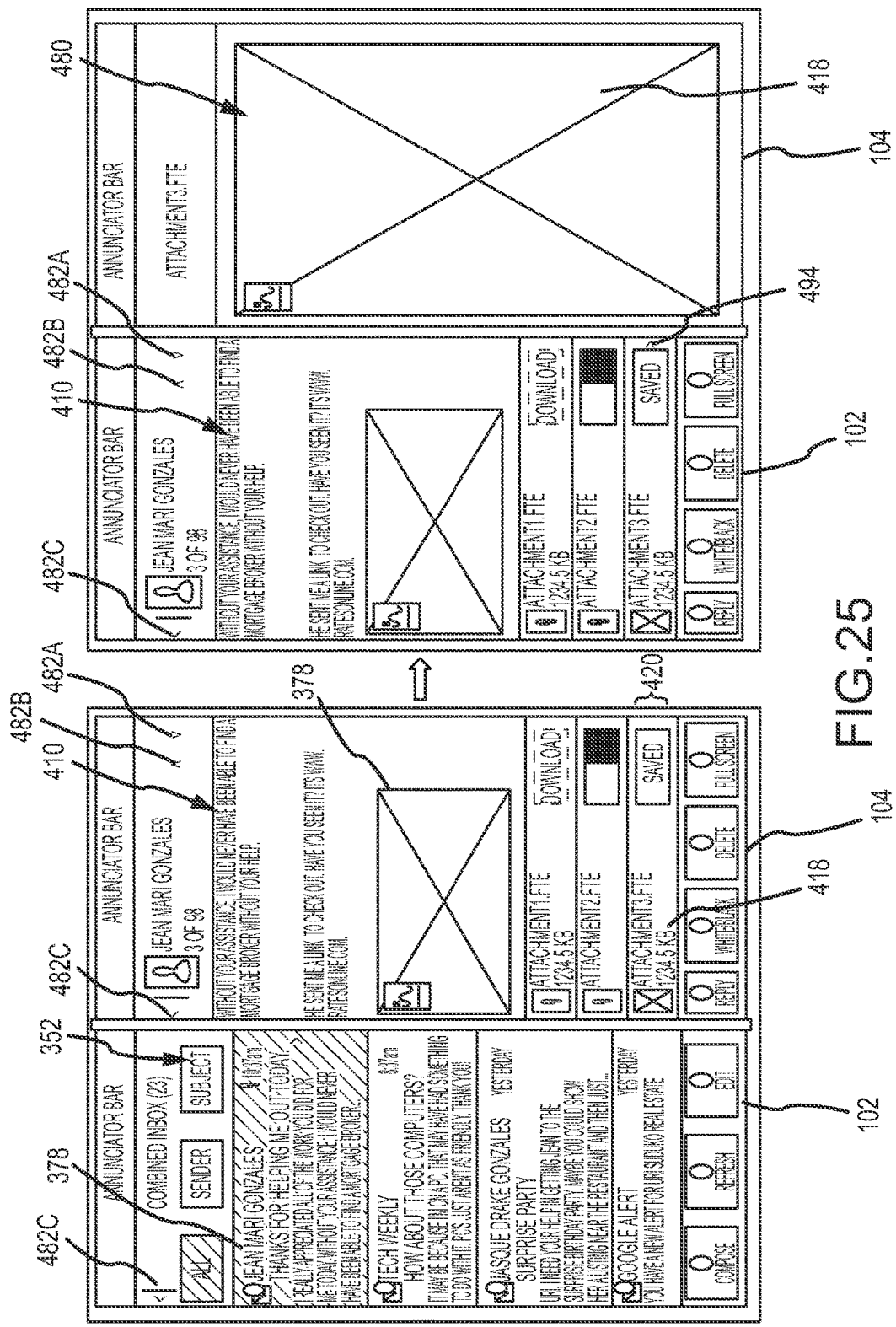
FIG. 25 is a representation of a change in the display of the screens of an email client in response to a user input.

The concept of navigation of a hierarchical application sequence is further depicted in FIG. 25. In the left portion of FIG. 25, the message listing screen 352 is depicted in the first display 102 and the message detail screen 410 is depicted in the second display 104. An attached file 418 included in the email message 378 shown in the message detail screen 352 may be selected when the email client is displayed as shown in the left portion of FIG. 25. Upon selection of the attached file 418, the displays 102 and 104 may change such that the message detail screen 410 is depicted in the first display 102 and an attachment screen 480 is displayed in the second display 104 that displays and/or executes the attached file 418. Additionally, a dependency indicator 494 is shown with respect to the third attachment bar 420C to indicate the attachment displayed in the attachment screen 480 corresponds to the third attachment bar 420C. Thus, the various levels of the hierarchical application may be navigated such that subsequent levels of the application screens are displayed upon navigation into lower levels of application.

Navigational function buttons 482 may be provided (e.g., back buttons 482A, next 482B, previous 482C buttons, or the like) to help navigate the various level of the hierarchical screens of the email client. Accordingly, the next and previous message 352 in a message list 354 may be displayed upon selection of the next button 482A and previous buttons 482B, respectively. Furthermore, the back button 482C may be selected to move up one level in the hierarchical application sequence (e.g., such that the parent and grandparent screen of the screen on which the back button 482C is selected are displayed in the first and second displays 102 and 104). For example, if the back button 482C was selected in FIG. 24, the state of the displays may be changed as shown in FIG. 23 to display the folder management screen 310 (i.e., the grandparent screen of the message detail screen 410) and the message listing screen 352 (i.e., the parent screen of the message detail screen 410).

Furthermore, gesture inputs may be received to assist in navigating the various levels of screens of the email client. For example, receipt of a drag gesture 176 or a flick gesture 178 (as shown in FIG. 4) may result in movement of the screens displayed. The gesture inputs may be received at the display or, for example, at an off-screen gesture receipt area such as those shown in FIGS. 6A and 6B (e.g., touch sensors 106' and 106").

Furthermore, messages may be "dragged and dropped" to different locations within the email client. For instance, a message displayed in a message listing screen 352 as shown in FIG. 23 may be selected by initiation of a drag gesture 176 at the message. The message may then be dragged (i.e., by maintaining contact with the input device) to the folder management screen 310 such that the message is moved to a destination folder where the drag gesture terminates. This drag and drop functionality may be performed within a single display (i.e., where the gesture input is contained within a single display) or may span display devices (i.e., correspond with a gesture originating in a first display and terminating in a second display). The drag and drop gesture may be used to move messages, folders, attachments, or other elements without limitation.

Figure 26:
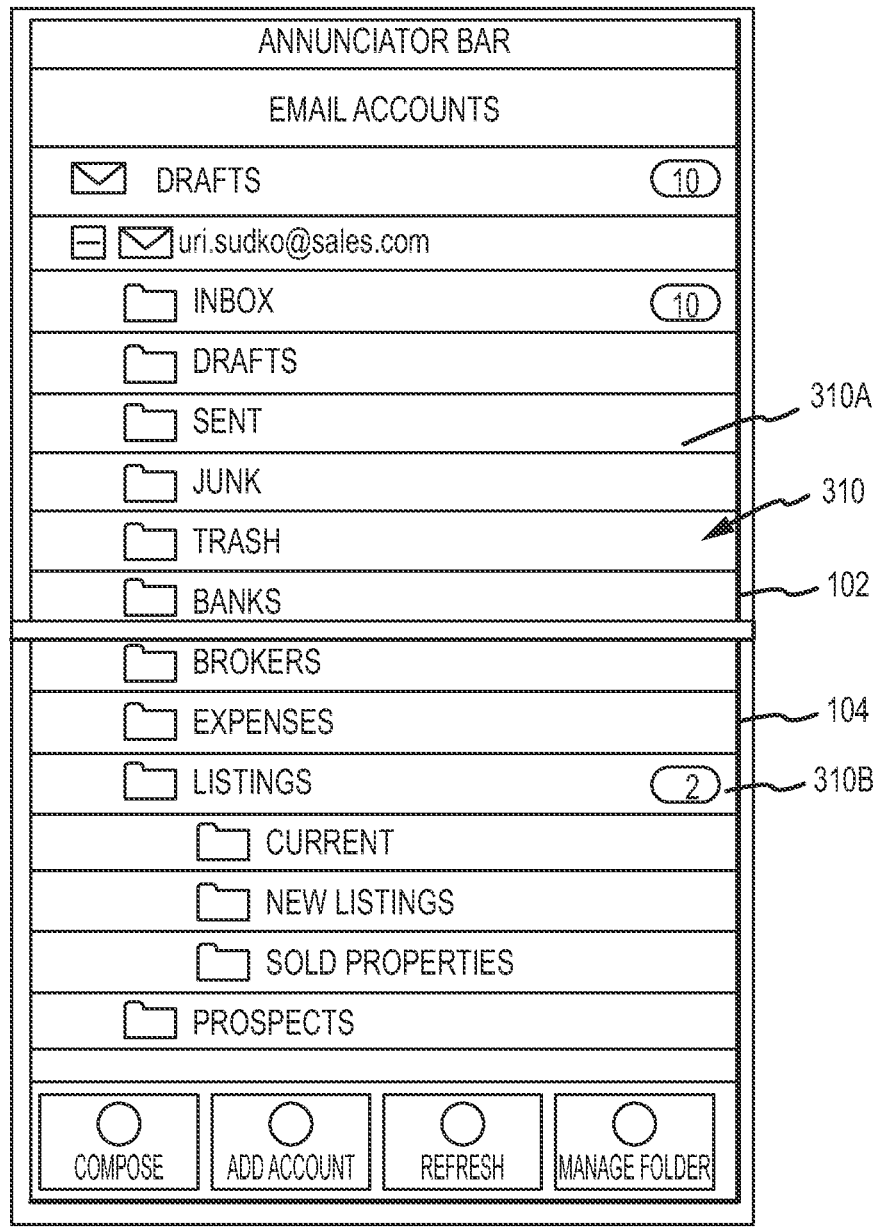
FIG. 26 is a screen shot of an embodiment of a folder management screen executing in dual screen mode.
Figure 27:
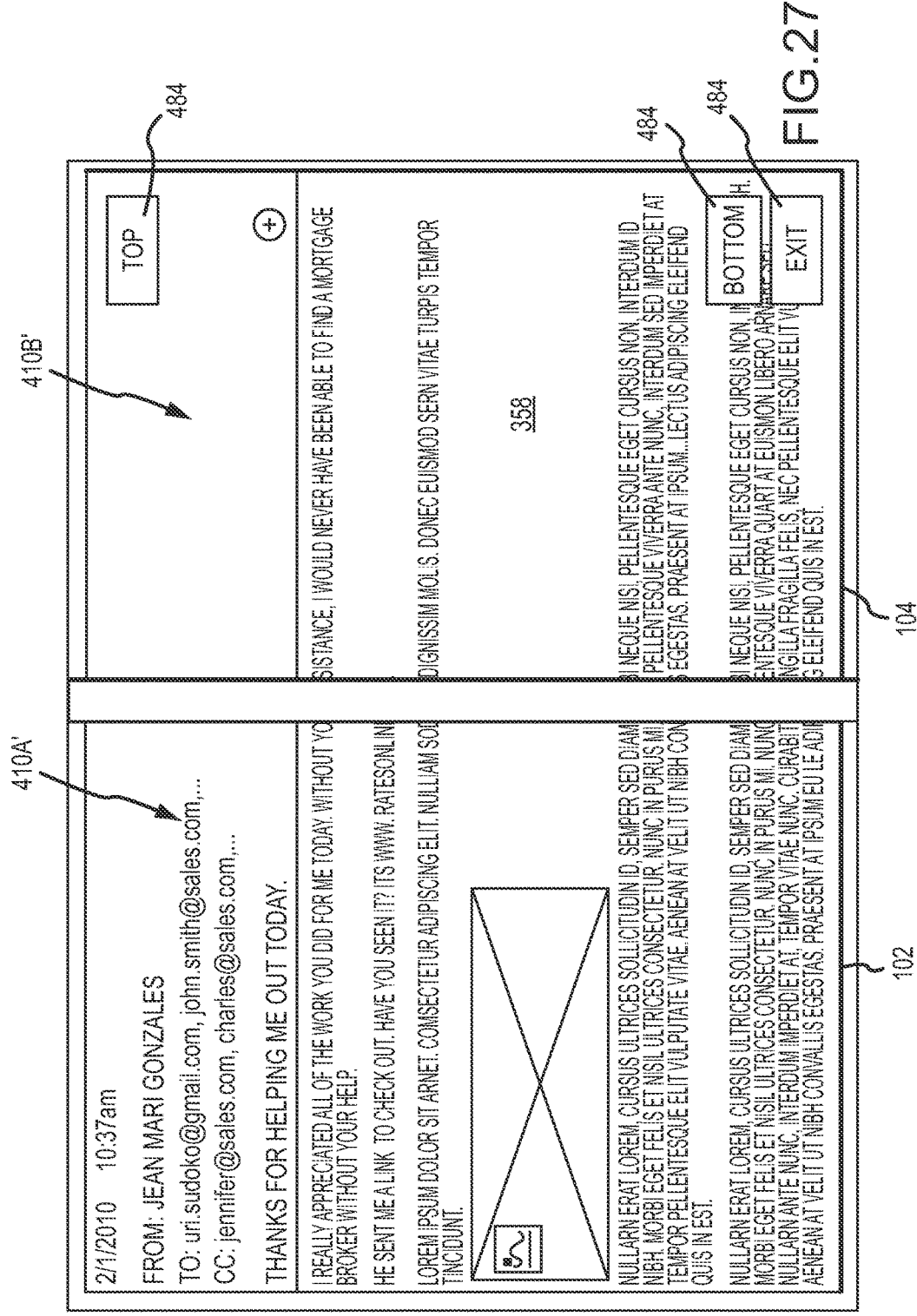
FIG. 27 is a screen shot of an embodiment of a message detail screen executing in full screen mode with respect to a plurality of displays.

As shown in FIG. 26, one or more of the screens displayable by the email client (e.g., in the case depicted in FIG. 26, the folder management screen 310) may be displayed such that a first portion of the screen 310A occupies the first display 102 and a second portion of the screen 310B occupies the second display 104. Accordingly, as shown in FIG. 26, a folder management screen 310 spans the first display 102 and the second display 104. In this regard, the folder management screen 310 may be presented in a portrait orientation even though the individual display portions are oriented in a landscape orientation. Furthermore, with additional reference to FIG. 27, the displays 102 and 104 of a handheld device 100 may also be utilized to display a full screen mode 410' of a message detail screen 410 in a similar manner as was described above. In this regard, as depicted FIG. 27, the first display maybe include a first portion 410A' of the full screen view of a message 358 and the second display 104 may display a second portion 410B' of a full screen view of the message 358. Phantom buttons 484 as described above may also be used in the dual display full screen depiction of a message 358 as shown in FIG. 27.

Furthermore, as depicted in FIG. 28, an email composition screen 386 may be displayed wherein an email message may be generated. For example, the email composition screen 386 may occupy the first display 102 of a handheld device 100. The second display 104 may be dedicated to an input portion 486 such as a keyboard 496 or other input screen used to generate an email message using the email composition screen 386 displayed in the first display 102.

Figure 29:
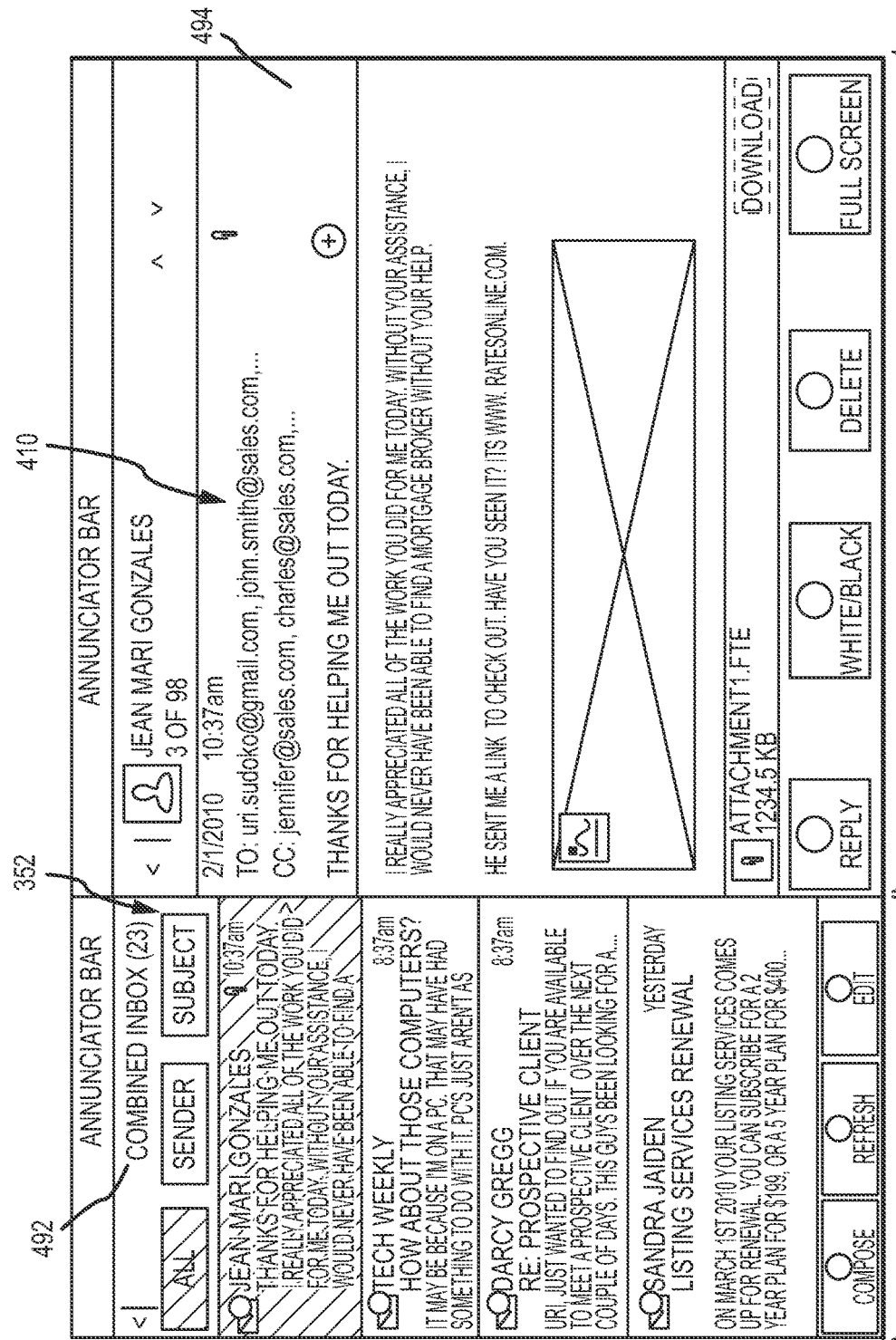
FIG. 29 is a screen shot of an embodiment of an email client executing in dual screen mode with nonsymmetrical sized screen portions.

Furthermore, it may be advantageous to display differently sized portions of the respective screens described herein. With further reference to FIG. 29, the message listing screen 352 may be presented with a first width 488 smaller than a second width 490 of the message detail view 410 as shown in FIG. 29. That is, a first display portion 492 in which the message listing screen 352 may be smaller than a second display portion 494 in which the message detail screen 410 is displayed. This may correspond to a dual screen device 100 having a first display 102 and a second display 104 as described above, or may correspond to a single display that is divided into the plurality of display portions (e.g., first portion 492 and second portion 494) in which the screens may be displayed.

Additionally, any of the foregoing screens described in relation to the email client may include an indication regarding loss of communication with one or more of the email servers with which the email client is configured to communicate. This may inform a user regarding the loss of connection such that, for example, remedial action may be taken. For instance, it is sometimes the case where a password associated with an email account must be periodically changed. Thus, upon requiring a change in password, the email server may become unresponsive when attempting to access the server with an outdated password. In this instance, upon notification to the user that the connection with the email server has been lost, the user may investigate as to the root of the cause.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A handheld electronic device, comprising:
    a microprocessor;
    a first display portion that is a first display device;
    a second display portion that is a second display device, distinct from the first display device, separated from the first display portion by a hinge disposed therebetween, the hinge configured to allow pivotal movement between the first display portion and the second display portion; and
    a computer memory coupled to the microprocessor and comprising instruction sets that are executable by the microprocessor, wherein the instruction sets cause the microprocessor to:
        execute a multi-screen email client on the handheld electronic device;
        display a first user interface screen portion on the first display portion, the first user interface screen portion corresponding to a first screen of the multi-screen email client, the first screen including an identification for one or more messages received by the multi-screen email client;
        display a second user interface screen portion on the second display portion, the second user interface screen portion corresponding to a second screen of the multi-screen email client, the second screen including a detail view of a selected message from the one or more messages, wherein the detail view includes a display element identifying a file attached to the selected message; and
        receive an input from a user at the second display portion corresponding to a selection of the display element identifying the file attached to the selected message while the first screen of the multi-screen email client is displayed on the first display portion; and
        in response to receiving the input from the user at the second display portion:
            move the first user interface screen portion off of the first display portion;
            move the second user interface screen portion off of the second display portion and onto the first display portion; and
            display or execute the file in the second display portion.

2. The handheld electronic device of claim 1, wherein prior to moving the first user interface portion off of the first display portion, the first user interface portion includes a first dependency indicator providing an indication that the detail view displayed in the second display portion corresponds to the selected message in the first display portion.

3. The handheld electronic device of claim 2, wherein in response to receiving the input from the user, the display element includes a second dependency indicator providing an indication that the file displaying or executing in the second display portion corresponds to the display element displayed in the first display portion and identifying the file attached to the selected message.

4. The handheld electronic device of claim 3, wherein the second user interface screen portion includes a navigational function button configured to receive navigational input, and in response thereto, navigate between hierarchical screens of the multi-screen email client.

5. The handheld electronic device of claim 4, wherein the instruction sets further cause the microprocessor to:
    receive a navigational input from the user at the navigational function button on the second user interface screen portion; and
    move, in response to receiving the navigational input, the second user interface screen portion off of the first display portion and onto the second display portion and move the first user interface screen portion onto the first display portion.

6. The handheld electronic device of claim 5, wherein any screen of the multi-screen email client displayed in the first display portion is always a parent window to any other screen of the multi-screen email client that is displayed in the second display portion.

7. The handheld electronic device of claim 6, wherein the first display portion and the second display portion are in a portrait orientation, the portrait orientation defining a long dimension and a short dimension of each display portion, and wherein the first display portion and the second display portion are disposed side-by-side and adjacent to one another along the long dimension of each display portion.

8. A method of operation of a multi-screen email client, the method comprising:
    executing the multi-screen email client on a handheld electronic device having at least a first display portion that is a first display device and a second display portion that is a second display device, distinct from the first display device, wherein the second display portion is separated from the first display portion by a hinge disposed therebetween, the hinge configured to allow pivotal movement between the first display portion and the second display portion;
    displaying a first user interface screen portion on the first display portion, the first user interlace screen portion corresponding to a first screen of the multi-screen email client, the first screen including an identification for one or more messages received by the multi-screen email client;
    displaying a second user interface screen portion on the second display portion, the second user interface screen portion corresponding to a second screen of the multi-screen email client, the second screen including a detail view of a selected message from the one or more messages, wherein the detail view includes a display element identifying a file attached to the selected message;
    receiving an input from a user at the second display portion corresponding to a selection of the display element identifying the file attached to the selected message while displaying the first screen of the multi-screen email client on the first display portion; and
    in response to receiving the input from the user at the second display portion:

moving the first user interface screen portion off of the first display portion;

moving the second user interface screen portion off of the second display portion and onto the first display portion; and displaying or executing the file in the second display portion.

9. The method of claim 8, wherein prior to moving the first user interface portion off of the first display portion, the first user interface portion includes a first dependency indicator providing an indication that the detail view corresponds to the selected message.

10. The method of claim 9, wherein in response to receiving the input from the user, the display element includes a second dependency indicator providing an indication that the file displaying or executing in the second display portion corresponds to the display element identifying the file attached to the selected message.

11. The method of claim 10, wherein the second user interface screen portion includes a navigational function button configured to receive navigational input, and in response thereto, navigate between hierarchical screens of the multi-screen email client.

12. The method of claim 11, further comprising:

receiving a navigational input from the user at the navigational function button on the second user interface screen portion; and moving, in response to receiving the navigational input, the second user interface screen portion off of the first display portion and onto the second display portion and move the first user interface screen portion onto the first display portion.

13. The method of claim 12, wherein any screen of the multi-screen email client displayed in the first display portion is always a parent window to any other screen of the multi-screen email client that is displayed in the second display portion.

14. The method of claim 12, wherein the first display portion and the second display portion are in a portrait orientation, the portrait orientation defining a long dimension and a short dimension of each display portion, and wherein the first display portion and the second display portion are disposed side-by-side and adjacent to one another along the long dimension of each display portion.

15. A non-transitory computer readable medium comprising:

a multi-screen email client executable by a processor of a handheld electronic device, wherein the handheld electronic device comprises at least a first display portion that is a first display device and a second display portion that is a second display device, distinct from the first display device, separated by a hinge disposed therebetween, the hinge configured to allow pivotal movement between the first display portion and the second display portion, and the multi-screen email client, when executed by the processor of the handheld electronic device, causes the handheld electronic device to:

display a first user interface screen portion on the first display portion, the first user interface screen portion corresponding to a first screen of the multi-screen email client, the first screen including an identification for one or more messages received by the multi-screen email client; and display a second user interface screen portion on the second display portion, the second user interface screen portion corresponding to a second screen of the multi-screen email client, the second screen including a detail view of a selected message from the one or more messages, wherein the detail view includes a display element identifying a file attached to the selected message;

receive an input from a user at the second display portion corresponding to a selection of the display element identifying the file attached to the selected message while the first screen of the multi-screen email client is displayed on the first display portion; and in response to receiving the input from the user at the second display portion;

move the first user interface screen portion off of the first display portion;

move the second user interface screen portion off of the second display portion and onto the first display portion; and display or execute the file in the second display portion.

* * * * *

UNITED STATES PATENT AND TRADEMARK OFFICE
CERTIFICATE OF CORRECTION

PATENT NO. : 10,503,381 B2
APPLICATION NO. : 15/075644
DATED : December 10, 2019
INVENTOR(S) : Rodney W. Schrock et al.

Page 1 of 1

It is certified that error appears in the above-identified patent and that said Letters Patent is hereby corrected as shown below:

In the Claims

Claim 8, Column 28, Line 48, delete "interlace" and insert --interface-- therein.

Signed and Sealed this
Seventh Day of April, 2020

Andrei Iancu
*Director of the United States Patent and Trademark Office*